US007664935B2

(12) United States Patent
Coon et al.

(10) Patent No.: US 7,664,935 B2
(45) Date of Patent: *Feb. 16, 2010

(54) SYSTEM AND METHOD FOR TRANSLATING NON-NATIVE INSTRUCTIONS TO NATIVE INSTRUCTIONS FOR PROCESSING ON A HOST PROCESSOR

(76) Inventors: Brett Coon, 3524 Squire Creek Cir., San Jose, CA (US) 95121; Yoshiyuki Miyayama, 2171 Rancho McCormick Blvd., Santa Clara, CA (US) 95050; Le Trong Nguyen, 15096 Danielle Pl., Monte Sereno, CA (US) 95030; Johannes Wang, 25 King St., Redwood City, CA (US) 94062

( * ) Notice: Subject to any disclaimer, the term of this patent is extended or adjusted under 35 U.S.C. 154(b) by 25 days.

This patent is subject to a terminal disclaimer.

(21) Appl. No.: 12/046,318

(22) Filed: Mar. 11, 2008

(65) Prior Publication Data

US 2008/0162880 A1 Jul. 3, 2008

Related U.S. Application Data

(63) Continuation of application No. 11/167,289, filed on Jun. 28, 2005, now Pat. No. 7,343,473, which is a continuation of application No. 10/061,295, filed on Feb. 4, 2002, now Pat. No. 6,954,847, which is a continuation of application No. 09/852,295, filed on May 10, 2001, now abandoned, which is a continuation of application No. 09/401,860, filed on Sep. 22, 1999, now Pat. No. 6,263,423, which is a continuation of application No. 08/784,339, filed on Jan. 16, 1997, now Pat. No. 5,983,334, which is a continuation of application No. 08/460,272, filed on Jun. 2, 1995, now Pat. No. 5,619,666, which is a continuation of application No. 07/857,599, filed on Mar. 31, 1992, now Pat. No. 5,438,668.

(51) Int. Cl.
*G06F 9/30* (2006.01)

(52) U.S. Cl. .................. 712/210; 712/214; 712/23
(58) Field of Classification Search ................ 712/204, 712/219, 41, 210, 214, 23; 717/136; 711/118
See application file for complete search history.

(56) References Cited

U.S. PATENT DOCUMENTS 3,346,851 A 10/1967 Thornton et al.
(Continued)

FOREIGN PATENT DOCUMENTS

EP 0 136 179 A2 4/1985
(Continued)

OTHER PUBLICATIONS

8-Bit Embedded Controller Handbook, Intel, 1989, pp. 1-1 thru 1-19 and 3-1 thru 3-37.
(Continued)

*Primary Examiner*—Jungwon Chang
(74) *Attorney, Agent, or Firm*—Sterne, Kessler, Goldstein & Fox P.L.L.C.

(57) ABSTRACT

A system and method for extracting complex, variable length computer instructions from a stream of complex instructions each subdivided into a variable number of instructions bytes, and aligning instruction bytes of individual ones of the complex instructions. The system receives a portion of the stream of complex instructions and extracts a first set of instruction bytes starting with the first instruction bytes, using an extract shifter. The set of instruction bytes are then passed to an align latch where they are aligned and output to a next instruction detector. The next instruction detector determines the end of the first instruction based on said set of instruction bytes. An extract shifter is used to extract and provide the next set of instruction bytes to an align shifter which aligns and outputs the next instruction. The process is then repeated for the remaining instruction bytes in the stream of complex instructions. The isolated complex instructions are decoded into nano-instructions which are processed by a RISC processor core.

18 Claims, 17 Drawing Sheets

U.S. PATENT DOCUMENTS

| | | | |
|---|---|---|---|
| 3,771,138 A | 11/1973 | Celtruda et al. | |
| 3,789,365 A | 1/1974 | Jen et al. | |
| 3,916,388 A | 10/1975 | Shimp et al. | |
| 4,034,349 A | 7/1977 | Monaco et al. | |
| 4,084,235 A | 4/1978 | Hirtle et al. | |
| 4,189,768 A | 2/1980 | Liptay et al. | |
| 4,189,772 A | 2/1980 | Liptay | |
| 4,200,927 A | 4/1980 | Hughes et al. | |
| 4,228,495 A | 10/1980 | Bernhard et al. | |
| 4,236,206 A | 11/1980 | Strecker et al. | |
| 4,296,470 A | 10/1981 | Fairchild et al. | |
| 4,315,314 A | 2/1982 | Russo | |
| 4,317,170 A | 2/1982 | Wada et al. | |
| 4,410,939 A | 10/1983 | Kawakami | |
| 4,434,461 A | 2/1984 | Puhl | |
| 4,454,578 A | 6/1984 | Matsumoto et al. | |
| 4,456,955 A | 6/1984 | Yanagita et al. | |
| 4,459,657 A | 7/1984 | Murao | |
| 4,476,525 A | 10/1984 | Ishii | |
| 4,514,803 A | 4/1985 | Agnew et al. | |
| 4,569,016 A | 2/1986 | Hao et al. | |
| 4,587,612 A | 5/1986 | Fisk et al. | |
| 4,626,989 A | 12/1986 | Torii | |
| 4,654,781 A | 3/1987 | Schwartz et al. | |
| 4,675,806 A | 6/1987 | Uchida | |
| 4,714,994 A | 12/1987 | Oklobdzija et al. | |
| 4,722,049 A | 1/1988 | Lahti | |
| 4,739,471 A | 4/1988 | Baum et al. | |
| 4,752,873 A | 6/1988 | Shonai et al. | |
| 4,758,948 A | 7/1988 | May et al. | |
| 4,766,566 A | 8/1988 | Chuang | |
| 4,771,376 A | 9/1988 | Kamiya | |
| 4,807,115 A | 2/1989 | Torng | |
| 4,814,976 A | 3/1989 | Hansen et al. | |
| 4,841,476 A | 6/1989 | Mitchell et al. | |
| 4,858,105 A | 8/1989 | Kuriyama et al. | |
| 4,897,810 A | 1/1990 | Nix | |
| 4,901,228 A | 2/1990 | Kodama | |
| 4,903,196 A | 2/1990 | Pomerene et al. | |
| 4,924,376 A | 5/1990 | Ooi | |
| 4,926,323 A | 5/1990 | Baror et al. | |
| 4,942,525 A | 7/1990 | Shintani et al. | |
| 4,985,825 A | 1/1991 | Webb, Jr. et al. | |
| 4,992,931 A | 2/1991 | Hirasawa | |
| 4,992,934 A | 2/1991 | Portanova et al. | |
| 4,992,938 A | 2/1991 | Cocke et al. | |
| 5,003,462 A | 3/1991 | Blaner et al. | |
| 5,006,980 A * | 4/1991 | Sanders et al. | 712/219 |
| 5,019,967 A | 5/1991 | Wheeler et al. | |
| 5,101,341 A | 3/1992 | Circello et al. | |
| 5,127,091 A | 6/1992 | Boufarah et al. | |
| 5,133,072 A | 7/1992 | Buzbee | |
| 5,148,528 A | 9/1992 | Fite et al. | |
| 5,155,843 A * | 10/1992 | Stamm et al. | 714/5 |
| 5,168,571 A * | 12/1992 | Hoover et al. | 712/210 |
| 5,193,206 A * | 3/1993 | Mills | 712/41 |
| 5,226,126 A | 7/1993 | McFarland et al. | |
| 5,226,170 A | 7/1993 | Rubinfeld | |
| 5,230,068 A | 7/1993 | Van Dyke et al. | |
| 5,307,492 A | 4/1994 | Benson | |
| 5,307,504 A * | 4/1994 | Robinson et al. | 712/41 |
| 5,355,460 A | 10/1994 | Eickemeyer et al. | |
| 5,390,355 A | 2/1995 | Horst | |
| 5,430,862 A | 7/1995 | Smith et al. | |
| 5,438,668 A * | 8/1995 | Coon et al. | 712/204 |
| 5,442,757 A | 8/1995 | McFarland et al. | |
| 5,450,575 A | 9/1995 | Sites | |
| 5,487,156 A | 1/1996 | Popescu et al. | |
| 5,507,030 A * | 4/1996 | Sites | 717/136 |
| 5,539,911 A | 7/1996 | Nguyen et al. | |
| 5,546,552 A | 8/1996 | Coon et al. | |
| 5,560,032 A | 9/1996 | Nguyen et al. | |
| 5,561,776 A | 10/1996 | Popescu et al. | |
| 5,574,927 A | 11/1996 | Scantlin | |
| 5,592,636 A | 1/1997 | Popescu et al. | |
| 5,619,666 A | 4/1997 | Coon et al. | |
| 5,625,837 A | 4/1997 | Popescu et al. | |
| 5,627,983 A | 5/1997 | Popescu et al. | |
| 5,651,125 A | 7/1997 | Witt et al. | |
| 5,655,097 A | 8/1997 | Witt et al. | |
| 5,689,720 A | 11/1997 | Nguyen et al. | |
| 5,708,841 A | 1/1998 | Popescu et al. | |
| 5,751,981 A | 5/1998 | Witt et al. | |
| 5,768,575 A | 6/1998 | McFarland et al. | |
| 5,778,210 A | 7/1998 | Henstrom et al. | |
| 5,778,423 A * | 7/1998 | Sites et al. | 711/118 |
| 5,797,025 A | 8/1998 | Popescu et al. | |
| 5,832,205 A | 11/1998 | Kelly et al. | |
| 5,832,293 A | 11/1998 | Popescu et al. | |
| 5,983,334 A | 11/1999 | Coon et al. | |
| 6,141,742 A | 10/2000 | Favor | |
| 6,253,309 B1 | 6/2001 | Mahalingaiah | |
| 6,263,423 B1 | 7/2001 | Coon et al. | |
| 6,954,847 B2 | 10/2005 | Coon et al. | |
| 7,343,473 B2 | 3/2008 | Coon et al. | |

FOREIGN PATENT DOCUMENTS

| | | |
|---|---|---|
| EP | 0 170 398 A2 | 2/1986 |
| EP | 0 171 595 A2 | 2/1986 |
| EP | 0 272 198 A2 | 6/1988 |
| EP | 0 272 198 A3 | 6/1988 |
| EP | 0 354 585 A2 | 2/1990 |
| EP | 0 354 585 A3 | 2/1990 |
| EP | 0 368 332 A2 | 5/1990 |
| EP | 0 368 332 A3 | 5/1990 |
| EP | 0 372 751 A2 | 6/1990 |
| EP | 0 372 751 A3 | 6/1990 |
| EP | 0 377 991 A2 | 7/1990 |
| EP | 0 377 991 A3 | 7/1990 |
| EP | 0 380 854 A2 | 8/1990 |
| EP | 0 380 854 A3 | 8/1990 |
| EP | 0 402 856 A2 | 12/1990 |
| EP | 0 402 856 A3 | 12/1990 |
| EP | 0 419 105 A2 | 3/1991 |
| EP | 0 419 105 A3 | 3/1991 |
| EP | 0 426 393 A2 | 5/1991 |
| EP | 0 426 393 A3 | 5/1991 |
| EP | 0 459 232 A2 | 12/1991 |
| EP | 0 461 257 A1 | 12/1991 |
| EP | 0 473 420 A2 | 3/1992 |
| EP | 0 473 420 A3 | 3/1992 |
| EP | 0 479 390 A2 | 4/1992 |
| EP | 0 479 390 A3 | 4/1992 |
| FR | 2 575 564 A | 7/1986 |
| GB | 2 011 682 A | 7/1979 |
| GB | 2 230 116 A | 10/1990 |
| JP | 62-219128 A | 9/1987 |
| JP | 63-163634 A | 7/1988 |
| JP | 63-192135 A | 8/1988 |
| JP | 3-201030 A | 9/1991 |
| JP | 5-197544 A | 8/1993 |

OTHER PUBLICATIONS

Acosta, R. D. et al., "An Instruction Issuing Approach to Enhancing Performance in Multiple Functional Unit Processors," IEEE Transactions On Computers, IEEE, vol. C-35, No. 9, Sep. 1986, pp. 815-828.

Agerwala, T. and Cocke, J., High Performance Reduced Instruction Set Processors, IBM Research Division, Mar. 31, 1987, pp. 1-61.

Aiken, A. and Nicolau, A., "Perfect Pipelining: A New Loop Parallelization Technique," ESOP '88, 2nd European Symposium on Programming, Springer, 1988, pp. 221-235.

Andrews, W., "Distinctions Blur Between DSP Solutions," Computer Design, Publisher Unknown, vol. 28, No. 9, May 1, 1989, pp. 86-89, 92-94 and 96-99.

Bakoglu, H.B. et al., "IBM Second-Generation RISC Machine Organization", COMPCON Spring 90 digest of papers, IEEE Computer Society, 1990, pp. 173-178.

Charlesworth, A.E., "An Approach to Scientific Array Processing: The Architectural Design of the AP-120B/FPS-164 Family," Computer, IEEE, vol. 14, Sep. 1981, pp. 18-27.

Colwell, R.P. et al., "A VLIW Architecture for a Trace Scheduling Compiler," Proceedings of the 2nd International Conference on Architectural Support for Programming Languages and Operating Systems, IEEE Computer Society, Oct. 1987, pp. 180-192.

Crawford, J., "The Execution Pipeline of the Intel i486 CPU," Publication Source Unknown, IEEE, 1990, pp. 254-258.

Faix, M. and Schuenemann, C., "Combined Macro/Micro Program Machine," IBM Technical Disclosure Bulletin, IBM, vol. 14, No. 1, Jun. 1971, p. 298.

Foster, C.C. and Riseman, E.M., "Percolation of Code to Enhance Parallel Dispatching and Execution," IEEE Transactions On Computers, IEEE, Dec. 1972, pp. 1411-1415.

Garth, S.C.J., "Combining RISC and CISC in PC Systems," Publication Source, Publisher and Publication Date Unknown, pp. 10/1-10/5.

Goodman, J.R. and Hsu, W., "Code Scheduling and Register Allocation in Large Basic Blocks," Proceedings of the 2nd International Conference on Supercomputing, ACM, 1988, pp. 442-452.

Gross, T.R. and Hennessy, J.L., "Optimizing Delayed Branches," Proceedings of the 5th Annual Workshop on Microprogramming, IEEE & ACM, Oct. 5-7, 1982, pp. 114-120.

Groves, R.D. and Oehler, R., "An IBM Second Generation RISC Processor Architecture," Proceedings 1989 IEEE International Conference on Computer Design: VLSI in Computers and Processors, IEEE, Oct. 1989, pp. 134-137.

Heath, S., "Architectural considerations for a M88000 superscalar RISC processor," Publication Source, Publisher and Publication Date Unknown, pp. 6/1-6/6.

"High Performance Dual Architecture Processor," IBM Technical Disclosure Bulletin, IBM, vol. 36, No. 2, Feb. 1993, pp. 231-234.

Horst, R.W. et al., "Multiple Instruction Issue in the NonStop Cyclone Processor," Proceedings of the 17th Annual International Symposium on Computer Architecture, ACM, 1990, pp. 216-226.

Hwu, W. W. and Patt, Y.N., "Checkpoint Repair for High-Performance Out-of-Order Execution Machines," IEEE Transactions On Computers, IEEE, vol. C-36, No. 12, Dec. 1987, pp. 1496-1514.

Hwu, W.W. and Chang, P.P., "Exploiting Parallel Microprocessor Microarchitectures with a Compiler Code Generator," Proceedings of the 15th Annual Symposium on Computer Architecture, IEEE, Jun. 1988, pp. 45-53.

Hwu, W. and Patt, Y.N., "HPSm, a High Performance Restricted Data Flow Architecture Having Minimal Functionality," Proceedings of the 13th Annual Symposium on Computer Architecture, , IEEE, 1986, pp. 297-306.

i486.TM. Microprocessor Hardware Reference Manual, Order No. 240552, Intel Corporation, Santa Clara, California, 1990.

i486.TM. Microprocessor Programmer's Reference Manual, Order No. 240486, Intel Corporation, Santa Clara, California, 1990.

IBM Journal of Research and Development, IBM, vol. 34, No. 1, Jan. 1990, pp. 1-70.

Jelemensky, J. et al., "New Microcontroller Features Advanced Hardware For Real-Time Control Applications," Electro Conference Record, Publisher Unknown, vol. 14, Apr. 11, 1989, pp. 1-9.

Johnson, M., Superscalar Microprocessor Design, Prentice-Hall, Inc., 1991 (in it's entirety).

Johnson, W. M., Super-Scalar Processor Design, Dissertation for Stanford University, 1989, 134 pages.

Jouppi, N. P. and Wall, D.W., "Available Instruction-Level Parallelism for Superscalar and Superpipelined Machines," Proceedings—3rd International Conference on Architectural Support for Programming Languages and Operating Systems, ACM Press, Apr. 1989, pp. 272-282.

Jouppi, N. H., "Integration and Packaging Plateaus of Processor Performance," International Conference of Computer Design, IEEE, Oct. 2-4, 1989, pp. 229-232.

Jouppi, N. P., "The Nonuniform Distribution of Instruction-Level and Machine Parallelism and Its Effect on Performance," IEEE Transactions on Computers, IEEE, vol. 38, No. 12, Dec. 1989, pp. 1645-1658.

Melear, C., "The Design of the 88000 RISC Family," IEEE Micro, IEEE, vol. 9, No. 2, Apr. 1989, pp. 26-38.

Murakami, K. et al., "SIMP (Single Instruction stream/Multiple Instruction Pipelining): A Novel High-Speed Single-Processor Architecture," Proceedings of the 16th Annual International Symposium on Computer Architecture, ACM, 1989, pp. 78-85.

Nakano, H. et al., "A 80 MFLOPS 64-bit Microprocessor for Parallel Computer", IEEE 1991 Custom Integrated Circuits Conference, IEEE, 1991, pp. 15.2.1-15.2.4.

Odnert, D. et al., "Architecture and Compiler Enhancements for PA-RISC Workstations," COMPCON Spring '91 digest of papers, IEEE, 1991, pp. 214-218.

Ohr, S., "Superlong instructions help supermini refine number crunching," Electronic Design, Hayden Publishing, vol. 33, No. 26, Nov. 14, 1985, pp. 41, 42 and 44.

Keller, R.M., "Look-Ahead Processors," Computing Surveys, ACM, vol. 7, No. 4, Dec. 1975, pp. 177-195.

Lam, M.S., "Instruction Scheduling For Superscalar Architectures," Annu. Rev. Comput. Sci., Annual Reviews, Inc., vol. 4, 1990, pp. 173-201.

Lee, R.B., "Precision Architecture," Computer, IEEE, Jan. 1989, pp. 78-91.

McGeady, S., "The i960CA Superscalar Implementation of the 80960 Architecture", Publication Source Unknown, IEEE, 1990, pp. 232-240.

McNeley, K.J. and Milutinovic, V.M., "Emulating a Complex Instruction Set Computer with a Reduced Instruction Set Computer," IEEE Micro, IEEE, vol. 7, No. 1, Feb. 1987, pp. 60-71.

"Overlap of Store Multiple Operation With Succeeding Operations Through Second Set of General Purpose Registers," IBM Technical Disclosure Bulletin, IBM, vol. 28, No. 6, Nov. 1985, pp. 2727-2728.

Patent Abstracts of Japan, vol. 017, No. 082, for JP4282726, Feb. 18, 1993, 1 page.

Patent Abstracts of Japan, vol. 017, No. 084, for JP4286027, Feb. 19, 1993, 1 page.

Patent Abstracts of Japan, vol. 009, No. 006, for JP59154546, Jan. 11, 1985, 1 page.

Patent Abstracts of Japan, vol. 010, No. 089, for JP60225943, Apr. 8, 1986, 1 page.

Patt, Y.N. et al., "Critical Issues Regarding HPS, A High Performance Microarchitecture," Proceedings of the 18th Annual Workshop on Microprogramming, ACM, Dec. 1985, pp. 109-116.

Patt, Y.N. et al., "HPS, A New Microarchitecture: Rationale and Introduction," Proceedings of the 18th Annual Workshop on Microprogramming, ACM, Dec. 1985, pp. 103-108.

Patterson, D.A. and Hennessy, J.L., Computer Architecture: A Quantitative Approach, Morgan Kaufmann Publishers, Inc., 1990 (in its entirety).

Pleszkun, A.R. and Sohi, G.S., "The Performance Potential of Multiple Functional Unit Processors," Proceedings of the 15th Annual Symposium on Computer Architecture, IEEE, Jun. 1988, pp. 37-44.

Pleszkun, A.R. et al., "WISQ: A Restartable Architecture Using Queues," Proceedings of the 14th International Symposium on Computer Architecture, ACM, Jun. 1987, pp. 290-299.

Popescu, V. et al., "The Metaflow Architecture," IEEE Micro, IEEE, Jun. 1991, pp. 10-13 & 63-73.

Smith, M.D. et al., "Boosting Beyond Static Scheduling in a Superscalar Processor," ACM SIGARCH Computer Architecture News, ACM Press, vol. 18, Issue 3, Jun. 1990, pp. 344-354.

Smith, J.E. and Pleszlkun, A.R., "Implementation of Precise Interrupts in Pipelined Processors," Proceedings of the 12th Annual International Symposium on Computer Architecture, IEEE, Jun. 1985, pp. 36-44.

Smith, J.E. et al., "Implementing Precise Interrupts in Pipelined Processors," IEEE Transactions on Computers, IEEE, vol. 37, No. 5, May 1998, pp. 562-573.

Smith, M.D. et al., "Limits on Multiple Instruction Issue," Proceedings of the 3rd International Conference on Architectural Support for Programming Languages and Operating Systems, ACM, Apr. 1989, pp. 290-302.

Sohi, G. S. and Vajapeyam, S., "Instruction Issue Logic For High-Performance, Interruptable Pipelined Processors," Proceedings of the 14.sup.th Annual International Symposium on Computer Architecture, ACM, Jun. 2-5, 1987, pp. 27-34.

Thornton, J.E., Design of a Computer: The Control Data 6600, Control Data Corporation, 1970, pp. 58-140.

Tjaden, G.S. and Flynn, M.J., "Detection and Parallel Execution of Independent Instructions," IEEE Transactions On Computers, IEEE, vol. C-19, No. 10, Oct. 1970, pp. 889-895.

Tjaden, G.S. and Flynn, M.J., "Representation of Concurrency with Ordering Matrices," IEEE Transactions On Computers, IEEE, vol. C-22, No. 8, Aug. 1973, pp. 752-761.

Tjaden, G.J., Representation and Detection of Concurrency Using Ordering Matrices, (Dissertation), UMI Dissertation Services, 1972, pp. 1-199.

Tomasulo, R.M., "An Efficient Algorithm for Exploiting Multiple Arithmetic Units," IBM Journal, IBM, vol. 11, Jan. 1967, pp. 25-33.

Uht, A.K., "An Efficient Hardware Algorithm to Extract Concurrency From General-Purpose Code," Proceedings of the 19th Annual Hawaii International Conference on System Sciences, University of Hawaii, 1986, pp. 41-50.

Wedig, R.G., Detection of Concurrency in Directly Executed Language Instruction Streams, (Dissertation), UMI, Jun. 1982, pp. 1-179.

Weiss, S. and Smith, J.E., "Instruction Issue Logic in Pipelined Supercomputers," IEEE Transactions on Computers, IEEE, vol. C-33, No. 11, Nov. 1984, pp. 1013-1022 (77-86).

Weiss, R., "Third-Generation RISC Processors," EDN, Reed Business Information, Mar. 30, 1992, pp. 96-108.

Notice of Rejection from JP Appl. No. 517306/2003, 3 pages, dated Aug. 26, 2003.

Wharton, J. J., "Parallel 486 pipelines produce peak processor performance," Microprocessor Report, vol. 3, No. 6, Jun. 1989, pp. 13-17.

English Abstract of JP 62-219128, 1 page, supplied by espacenet database, Sep. 1987.

English Abstract of JP 63-163634, 1 page, supplied by espacenet database, Jul. 1988.

English Abstract of JP 3-201030, 1 page, supplied by espacenet database, Sep. 1991.

European Search Report from EP Appl. No. 00108579.4, 4 pages, dated Jan. 8, 2002.

* cited by examiner

FIG. 13A

IR MAP (1ST BYTE)

TO FIG. 13B

:BASIC IR

FIG. 13B

| | 0 | 1 | 1 | 1 | 0 | 1 | 1 | 0 |
|---|---|---|---|---|---|---|---|---|
| | | | 1 | | | | | |
| 0 | OR AL,Ib | OR eAX,Iv | 2-bytes escape | PUSH CS | OR Gb,Eb | OR Gv,Ev | OR Ev,Gv | OR Eb,Gb |
| | SBB AL,Ib | SBB eAX,Iv | POP DS | PUSH DS | SBB Gb,Eb | SBB Gv,Ev | SBB Ev,Gv | SBB Eb,Gb |
| | CMP AL,Ib | CMP eAX,Iv | AAS | SEG =DS | CMP Gb,Eb | CMP Gv,Ev | CMP Ev,Gv | CMP Eb,Gb |
| | SUB AL,Ib | SUB eAX,Iv | DAS | SEG =CS | SUB Gb,Eb | SUB Gv,Ev | SUB Ev,Gv | SUB Eb,Gb |
| | INSB Yb,DX | INSW/D Yv,DX | OUTSW/D DX,Xv | OUTSB DX,Xb | PUSH Ib | IMUL Gv,Ev,Ib | IMUL Gv,Ev,Iv | PUSH Iv |
| | JL Jb | JNL Jb | JNLE Jb | JLE Jb | JP Jb | JNP Jb | JNS Jb | JS Jb |
| | POP eSP | POP eBP | POP eDI | POP eSI | POP eDX | POP eBX | POP eCX | POP eAX |
| | DEC eSP | DEC eBP | DEC eDI | DEC eSI | DEC eDX | DEC eBX | DEC eCX | DEC eAX |
| | INT3 | INT Jb | IRET | INTO | RET far Iw | RET far | LEAVE | ENTER Iw,Ib |
| | ESC | ESC | ESC | ESC | ESC | ESC | ESC | ESC |
| | CLD | STD | Indirect grp5 | Inc/dec grp4 | CLI | STI | STC | CLC |
| | IN AL,DX | IN eAX,DX | OUT DX,eAX | OUT DX,AL | JMP Ap | JMP Jb | JMP Jv | CALL Av |
| | LODSB AL,Xb | LODSW/D eAX,Xv | SCASB AL,Xb | SCASW/D eAX,Xv | STOSB Yb,AL | STOSW/D Yv,eAX | TEST eAX,Iv | TEST AL,Ib |
| | MOVimm eSP | MOVimm eBP | MOVimm eDI | MOVimm eSI | MOVimm eDX | MOVimm eBX | MOVimm eCX | MOVimm eAX |
| | PUSHF Pv | POPF Pv | LAHF | SAHF | CALL Ap | WAIT | CWD CDQ | CBW CWDE |
| | MOV Ew,Sw | LEA Gv,M | POP Ev | MOV Sw,Ew | MOV Gb,Eb | MOV Gv,Ev | MOV Ev,Gv | MOV Eb,Gb |

FROM FIG. 13A

FIG. 13C

:BASIC IR

TO FIG. 13D

IR MAP (2ND BYTE)

| | 0 | 0 | 0 | 0 | 1 | 1 | 1 | 1 | 0 | 0 | 0 | 0 | 1 | 1 | 1 | 1 |
|---|---|---|---|---|---|---|---|---|---|---|---|---|---|---|---|---|
| | 0 | 0 | 1 | 1 | 0 | 0 | 1 | 1 | 0 | 0 | 1 | 1 | 0 | 0 | 1 | 1 |
| | 0 | 1 | 0 | 1 | 0 | 1 | 0 | 1 | 0 | 1 | 0 | 1 | 0 | 1 | 0 | 1 |
| 0000 | grp6 Ew | grp7 Me/Ew | LSL Gv,Ew | LAR Gv,Ew | | | CLTS | | | | | | | | | |
| 0001 | MOV Cd,Rd | MOV Dd,Rd | MOV Rd,Dd | MOV Rd,Cd | | MOV Rd,Td | | MOV Td,Rd | | | | | | | | |
| 0010 | | | | | | | | | | | | | | | | |
| 0011 | | | | | | | | | | | | | | | | |
| 1000 | XADD Eb,Gb | XADD Ev,Gv | | | | | | | | | | | | | | |
| 1001 | PUSH FS | POP FS | | | BT Ev,Gv | LSS Gv,Mp | CMPXCHG Eb,Gb | CMPXCHG Ev,Gv | | | SHLD Ev,Gv,Ib | SHLD Ev,Gv,CL | | | | |
| 1010 | | | | | BTR Ev,Gv | | MOVZX Gv,Eb | MOVZX Gv,Ew | | | LFS Gv,Mp | LGS Gv,Mp | | | | |
| 1011 | SETO Eb | SETNO Eb | SETB Eb | SETNB Eb | SETBE Eb | SETBE Eb | SETNBE Eb | SETZ Eb | SETNZ Eb | | | | | | | |
| 1100 | JO Jv | JNO Jv | JB Jv | JNB Jv | JBE Jv | JBE Jv | JNBE Jv | JZ Jv | JNZ Jv | | | | | | | |

FIG. 13D

| | 0 | | | | | | | | | | | | | | |
|---|---|---|---|---|---|---|---|---|---|---|---|---|---|---|---|
| | 0 | 1 | 1 | 0 | 1 | 1 | 0 | 0 | 1 | 1 | 0 | 0 | 1 | 1 | 0 |
| 0 | INVD | WBINVD | | | | | | | | | | | | | |
| | | | | | | | | BSWAP eAX | BSWAP eCX | BSWAP eDX | BSWAP eBX | BSWAP eSP | BSWAP eBP | BSWAP eSI | BSWAP eDI |
| | | | | | | | | | | | | | | | |
| | | | | | | | | PUSH GS | POP GS | BTS Ev,Gv | BTC Ev,Gv | grp8 Ev,Ib | MOVSX Gv,Eb | IMUL Gv,Ev | SHRD Ev,Gv,CL |
| | | | | | | | | SETS Eb | SETNS Eb | SETP Eb | SETNP Eb | SETL Eb | SETNL Eb | SETLE Eb | SETNLE Eb |
| | | | | | | | | JS Jv | JNS Jv | JP Jv | JNP Jv | JL Jv | JNL Jv | JLE Jv | JNLE Jv |

FROM FIG. 13C

IR MAP (MODR/M BYTE)

| m | od | n2 | n1 | n0 | r | / | m |

OPECODE EXTENTION

|   |   |   | 0 |   |   |   | 1 |   |   |
|---|---|---|---|---|---|---|---|---|---|
| n2 |   | 0 |   |   | 1 |   |   | 0 |   |
| n1 |   |   | 0 |   | 1 |   |   | 0 |   | 1 |
| n0 | 0 | 1 | 0 | 1 | 0 | 1 | 0 | 1 |
| 1 | ADD | OR | SBB | ADC | XOR | CMP | SUB | AND |
| 2 | ROL | ROR | RCR | RCL |  | SAR | SHR | SHL |
| 3 | TEST Ib/Iv |  | NEG | NOT | DIV AL/eAX | IDIV AL/eAX | IMUL AL/eAX | MUL AL/eAX |
| 4 | INC Eb | DEC Eb |  |  |  |  |  |  |
| 5 | INC Ev | DEC Ev | CALL Ep | CALL Ev | PUSH Ev |  | JUMP Ep | JUMP Ev |
| 6 | SLDT Ew | STR Ew | LTR Ew | LLDT Ew |  |  |  |  |
| 7 | SGDT Ms | SIDT Ms | LIDT Ms | LGDT Ms | LMSW Ew | INVLPG E | VERW Ew | VERR Ew |
| 8 |  |  |  |  | BTR | BTC | BTS | BT |

GROUP

FIG. 13E

|  | NIR3<br>(A1) | NIR2<br>(STORE) | NIR1<br>(A0) | NIR0<br>(LOAD) |
|---|---|---|---|---|
| BUCKET#3 | | | | |
| BUCKET#2 | | | | |
| BUCKET#1 | | | | |
| BUCKET#0 | PACKET1 | | PACKET0 | |

FIG. 16A

|  |  |  |  |
|---|---|---|---|
| BUCKET#3 | | | |
| BUCKET#2 | | | |
| BUCKET#1 | | | |
| BUCKET#0 | PACKET1 GEN | PACKET1 GEN | BUCKET GEN |

FIG. 16B

|  |  |  |  |
|---|---|---|---|
| BUCKET#3 | | | |
| BUCKET#2 | | | |
| BUCKET#1 | | | |
| BUCKET#0 | IMM1 | IMM0 | DISP |

| Section | Fields | Number of Bits |
|---|---|---|
| TYPE FIELD (NOP BITS) | A1_NOP (1) \| ST_NOP (1) \| A0_NOP (1) \| LD_NOP (1) | 4 |
| BUCKET GENERAL INFORMATION | SEL_FST (1) \| EX_ORDER (1) \| MIX (1) \| U_CODE (1) \| W_CODE (1) \| LOCK (1) \| UNLOCK (1) | 7 |
| PACKET0 GENERAL INFORMATION | P0_ASIZE (1) \| P0_OSIZE (3) \| P0_DPC (4) \| P0_ISIZE (2) \| P0_FPP (1) \| P0_ESC (1) \| P0_INORDER (1) | 13 |
| NIR0 (LOAD) | LD_OP (4) \| LD_FCNV (1) \| LD_MEM (1) \| IDX_EN (1) \| BASE_EN (1) \| DISP_EN (1) \| LD_RD (5) \| LD_SEG (3) \| LD_SCALE (2) \| LD_BASE (5) \| LD_IDX (3) | 28 |
| NIR1 (A0) | A0_OP (11) \| A0_FU (4) \| A0_FGNM (12) \| A0_RINV (4) \| A0_BI (1) \| A0_FPBK (1) \| A0_RDHI (1) \| A0_RSHI (1) \| A0_FBK (1) \| A0_RD (5) \| A0_RS (5) | 45 |
| NIR2 (STORE) | NONE-PRESENCE OF STORE IS DETERMINED BY TYPE FIELD | 0 |
| PACKET1 GENERAL INFORMATION | P1_ASIZE (1) \| P1_OSIZE (3) \| P1_DPC (4) \| P1_ISIZE (2) \| P1_FPP (1) \| P1_ESC (1) \| P1_INORDER (1) | 13 |
| NIR3 (A1) | A1_OP (11) \| A1_FU (4) \| A1_FGNM (12) \| A1_RINV (4) \| A1_BI (1) \| A1_FPBK (1) \| A1_RDHI (1) \| A1_RSHI (1) \| A1_FBK (1) \| A1_RD (5) \| A1_RS (5) | 45 |
| | | TOTAL 155 |

SYSTEM AND METHOD FOR TRANSLATING NON-NATIVE INSTRUCTIONS TO NATIVE INSTRUCTIONS FOR PROCESSING ON A HOST PROCESSOR

CROSS-REFERENCE TO RELATED APPLICATIONS

This application is a continuation of application Ser. No. 11/167,289, filed Jun. 28, 2005, now U.S. Pat. No. 7,343,473, which is a continuation of application Ser. No. 10/061,295, filed Feb. 4, 2002, now U.S. Pat. No. 6,954,847, which is a continuation of application Ser. No. 09/852,295, filed May 10, 2001, now abandoned, which is a continuation of application Ser. No. 09/401,860, filed Sep. 22, 1999, now U.S. Pat. No. 6,263,423, which is a continuation of application Ser. No. 08/784,339, filed Jan. 16, 1997, now U.S. Pat. No. 5,983,334, which is a continuation of application Ser. No. 08/460,272, filed Jun. 2, 1995, now U.S. Pat. No. 5,619,666, which is a continuation of application Ser. No. 07/857,599, filed Mar. 31, 1992, now U.S. Pat. No. 5,438,668. The disclosures of each of the above-referenced applications are incorporated herein by reference.

The following are related applications: "A ROM With RAM Cell and Cyclic Redundancy Check Circuit," application Ser. No. 07/802,816, filed Dec. 6, 1991, now abandoned; "High-Performance, Superscalar-Based Computer System with Out-of-Order Instruction Execution," application Ser. No. 07/817,810, filed Jan. 8, 1992, now U.S. Pat. No. 5,539,911, which is a continuation of application Ser. No. 07/727,006, filed Jul. 8, 1991, now abandoned; "High-Performance, Superscalar-Based Computer System with Out-of-Order Instruction Execution and Concurrent Results Distribution," application Ser. No. 08/397,016, filed Mar. 1, 1995, now U.S. Pat. No. 5,560,032, which is a file wrapper continuation of application Ser. No. 07/817,809, filed Jan. 8, 1992, now abandoned, which is a continuation of application Ser. No. 07/727,058 filed Jul. 8, 1991, now abandoned. The disclosures of each of the above-referenced applications are also incorporated herein by reference.

BACKGROUND OF THE INVENTION

1. Field of the Invention

The field of the invention generally relates to superscalar RISC microprocessors, more specifically, the invention relates to a CISC to RISC microprocessor instruction alignment unit and decode unit for permitting complex instructions to run on RISC-based hardware.

2. Related Art

All complex instruction set computers (CISC computers) which use variable length instructions are faced with the problem of determining the length of each instruction that is encountered in the instruction stream. Instructions are packed into memory as successive bytes of data, so that given the address of an instruction, it is possible to determine the starting address of the next instruction if you know the first instruction's length.

For a conventional processor, this length determination does not have a significant performance impact compared to other stages in the processing of an instruction stream, such as the actual execution of each instruction. As a result, fairly simple circuits are typically used. Superscalar reduced instruction set computers (RISC computers), on the other hand, can process instructions at a much higher rate, requiring instructions to be extracted from memory much more rapidly to keep up with the parallel execution of multiple instructions. This limiting factor imposed by the rate at which instructions can be extracted from memory is referred to as the Flynn Bottleneck.

The task of determining the length of each instruction and extracting that instruction from the instruction stream is performed by a function unit called an Instruction Align Unit (IAU). This block must contain decoder logic to determine the instruction length, and a shifter to align the instruction data with the decoder logic.

For the Intel 80386 microprocessor, the first byte of an instruction can have numerous implications on the overall instruction length, and may require that additional bytes be checked before the final length is known. Furthermore, the additional bytes may specify other additional bytes. It is therefore extremely difficult to quickly determine the length of the X86 instruction because the process is inherently sequential.

Based on the information provided in the i486™ Programmer's Reference Guide, several conclusions can be drawn regarding alignment unit present in the i486™. The i486™'s IAU is designed to look only at the first few bytes of the instruction. In cases where these bytes do not fully specify the length, these initial bytes are extracted and the process is repeated on the remaining bytes. Each iteration of this process requires a full cycle, so it may take several cycles, at worst case, for an instruction to be fully aligned.

Situations that require additional cycles for the i486™ IAU include the presence of prefixed and escaped (2 byte) opcodes. Both of these are common in i486™ programs. In addition, complex instructions may also comprise displacement and immediate data. The i486™ requires additional time to extract this data.

An example format for a CISC processor instruction is shown in FIG. 1. The example depicts the potential bytes of a variable length i486™ CISC instruction. The instructions are stored in memory on byte boundaries. The minimum length of an instruction is 1 byte, and the maximum length of an instruction, including prefixes, is 15 bytes. The total length of the instruction is determined by the Prefixes Opcode, ModR/M and SIB bytes.

BRIEF SUMMARY OF THE INVENTION

The present invention is a subsystem and method of a microprocessor having a superscalar reduced instruction set computer (RISC) processor designed to emulate a complex instruction set computer (CISC), such as an Intel 80×86 microprocessor, or other CISC processors.

The CISC to RISC translation operation of the present invention involves two basic steps. CISC instructions must first be extracted from the instruction stream, and then decoded to generate nano-instructions that can be processed by the RISC processor. These steps are performed by an Instruction Alignment Unit (IAU) and an Instruction Decode Unit (IDU), respectively.

The IAU functions to extract individual CISC instructions from the instruction stream by looking at the oldest 23 bytes of instruction data. The IAU extracts 8 continuous bytes starting with any byte in a bottom line of an Instruction FIFO. During each clock phase, the IAU determines the length of the current instruction and uses this information to control two shifters to shift out the current instruction, leaving the next sequential instruction in the stream. The IAU therefore outputs an aligned instruction during each clock phase, for a peak rate of two instructions per cycle. Exceptions to this best case performance are discussed below in sections 2.0 and 2.1.

After CISC instructions have been extracted from memory, the IDU functions to convert these aligned instructions to equivalent sequences of RISC instructions, called nano-instructions. The IDU looks at each aligned instruction as it is output by the IAU, and decodes it to determine various factors such as the number and type of nano-instruction(s) required, the size of the data operands, and whether or not a memory access is required to complete the aligned instruction. Simple instructions are directly translated by decoder hardware into nano-instructions, while more complex CISC instructions are emulated by subroutines in a special instruction set, called microcode routines, which are then decoded into nano-instructions. This information is collected for two instructions during a complete cycle, and then combined together to form an instruction bucket, containing the nano-instructions corresponding to both source instructions. This bucket is then transferred to an Instructions Execution Unit (IEU) for execution by a RISC processor. The execution of the nano-instruction buckets is outside the scope of the present invention.

The foregoing and other features and advantages of the invention will be apparent from the following more particular description of preferred embodiments of the invention, as illustrated in the accompanying drawings.

BRIEF DESCRIPTION OF THE DRAWINGS/FIGURES

The invention will be better understood if reference is made to the accompanying drawings in which:

Figure 13A:
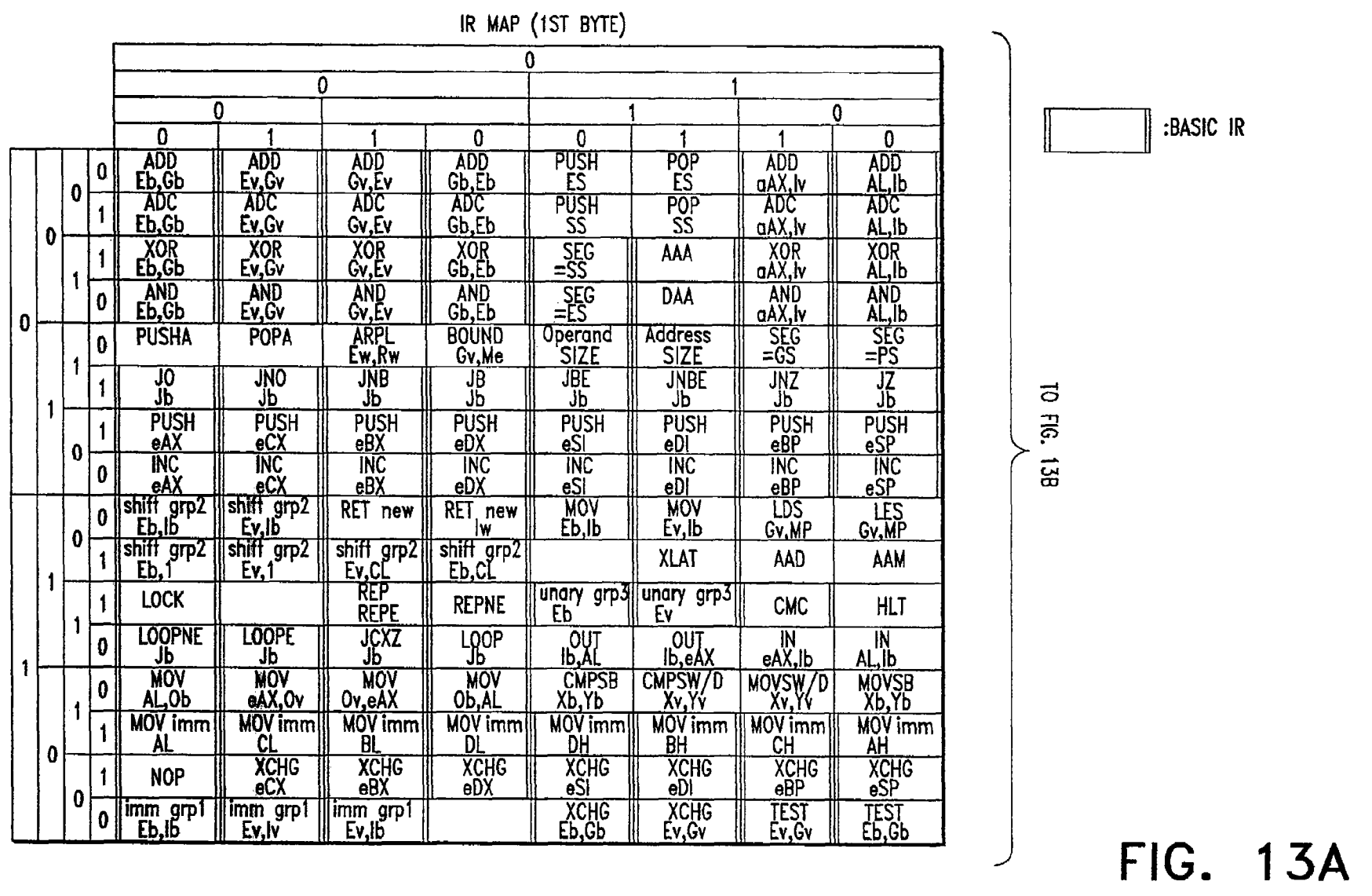

FIGS. 13A, 13B, 13C, 13D and 13E show instruction bit maps of the present invention.

FIG. 16A shows details of a conceptual block diagram of the decode FIFO of the present invention.

FIG. 16B shows details of a conceptual block diagram of the decode FIFO of the present invention.

FIG. 16C shows details of a conceptual block diagram of the decode FIFO of the present invention.

FIG. 17 shows examples of the nano-instruction field formats of the present invention.

DETAILED DESCRIPTION OF THE INVENTION

Table of Contents 1.0 The Instruction Fetch Unit
2.0 Instruction Alignment Unit Overview
2.1 Instruction Alignment Unit Block Diagrams
3.0 Instruction Decode Unit Overview
3.1 Microcode Dispatch Logic
3.2 Mailboxes
3.3 Nano-Instruction Format
3.4 Special Instructions
3.5 Instruction Decode Unit Block Diagrams
4.0 Decoded Instruction FIFO A more detailed description of some of the basic concepts discussed in this section is found in a number of references, including Mike Johnson, *Superscalar Microprocessor Design* (Prentice-Hall, Inc., Englewood Cliffs, N.J., 1991); John L. Hennessy et al., *Computer Architecture—A Quantitative Approach*" (Morgan Kaufmann Publishers, Inc., San Mateo, Calif., 1990); and the i486™ *Microprocessor Programmer's Reference Manual* and the i486™*Microprocessor Hardware Reference Manual* (Order Nos. 240486 and 240552, respectively, Intel Corporation, Santa Clara, Calif., 1990). The disclosures of these publications are incorporated herein by reference.

1.0 The Instruction Fetch Unit

Figure 1:
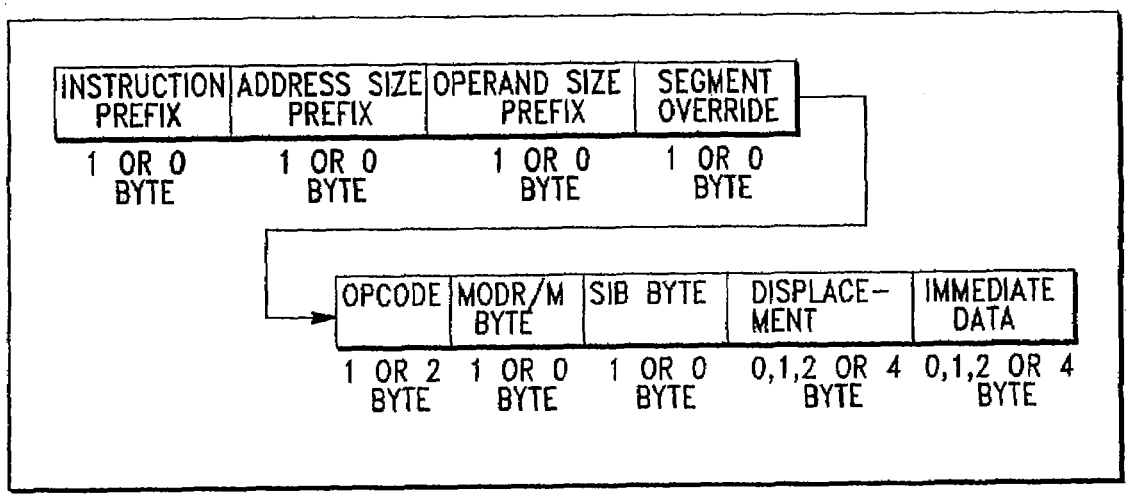
FIG. 1 shows the data structure format for a conventional CISC instruction.
Figure 2:
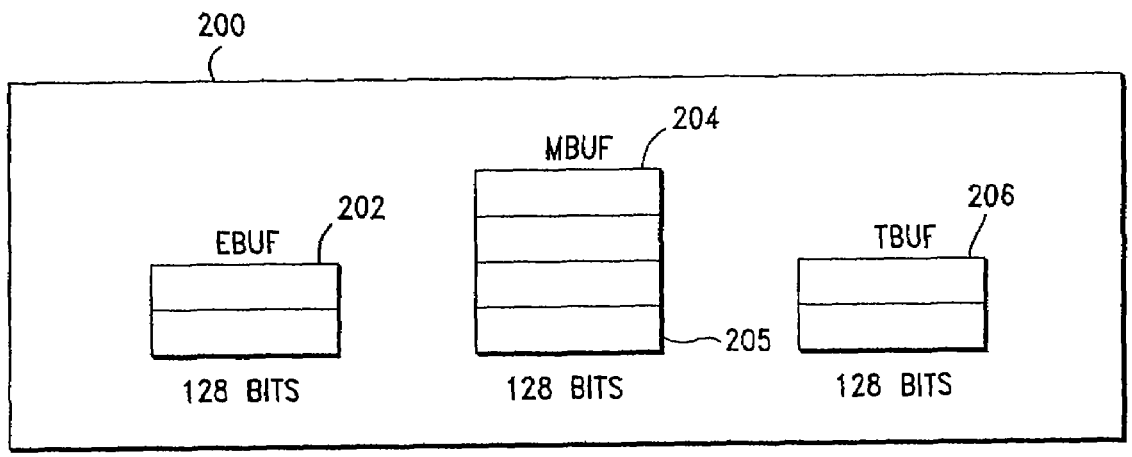
FIG. 2 shows a block diagram of the instruction prefetch buffer of the present invention.

An instruction Fetch Unit (IFU) of the present invention is used to fetch instruction bytes from an instruction stream stored in an instruction memory, instruction cache, or the like, and provide the instruction bytes to a decoder section for execution. Instructions to be aligned by the Instruction Alignment Unit are therefore supplied by the IFU. FIG. 2 shows a block diagram of three Instruction Prefetch Buffers 200 within the IFU, which comprises: a Main instruction BUFfer (MBUF) 204, an Emulation instruction BUFfer (EBUF) 202, and a Target instruction BUFfer (TBUF) 206. The Prefetch Instruction Buffers can load 128 bits (16 bytes) of an instruction stream from an instruction cache in a single cycle. This data is held in one of the three buffers for use by the IAU.

During normal program execution, the MBUF 204 is used to supply instruction bytes to the IAU. When conditional control flow (i.e., a conditional branch instruction) is encountered, instructions corresponding to the branch target address are stored in the TBUF 206 while execution continues from the MBUF 204. Once the branch decision is resolved, either the TBUF 206 is discarded if the branch is not taken, or the TBUF 206 is transferred to the MBUF if the branch is taken. In either case, execution continues from the MBUF.

The EBUF 202 operates in a slightly different way. When emulation mode is entered, whether due to an emulation instruction or an exception, both instruction fetching and execution are transferred to the EBUF 202. (Emulation mode and exception handling will both be discussed below in detail.) Execution continues out of the EBUF 202 as long as the processor is in emulation mode. When the emulation routine finishes, execution is continued from the instruction data remaining in the MBUF 204. This eliminates the need to refetch the main instruction data after executing an emulation routine.

2.0 Instruction Alignment Unit Overview

An Instruction Alignment Unit subsystem in combination with the present invention uses the RISC strategy of making the common case fast to deal with by using the superior per-cycle instruction throughput of a superscalar processor.

In the context of the present invention, the term "align" means to position an instruction's bytes so that they can be distinguished from adjacent bytes in the instruction stream for later decoding. The IAU distinguishes the end of the current instruction from the beginning of the next instruction by determining the number of bytes in the current instruction. The IAU then aligns the current instruction so that the least significant byte presented to the IDU is the first byte of the current instruction. Different ordering of the bytes as they are presented to the IDU is also possible.

The IAU subsystem of the present invention is capable of aligning most common instructions at a rate of two per cycle at all clock rates, and provides the capability of aligning most other instructions at this same rate at reduced clock speeds. Instructions including prefixes require an additional half cycle to align. Immediate data and displacement fields are extracted in parallel, and thus, require no extra time.

Additionally, the IAU worst-case alignment time is only 2.0 cycles for an instruction, which is less than the time required to align many common instructions in conventional CISC processors. The worst-case occurs when the instruction has one or more prefixes (half cycle total to align), the instruction is from the set that requires a full cycle to determine the length, and the instruction (not including the prefixes) is greater than eight bytes in length (which requires an extra half cycle, thus totaling 2 full cycles).

This performance is achieved through several architectural features. First, the IAU is designed to perform a complete alignment operation during each phase of the clock by using alternate phase latches and multiplexers in the alignment circuitry. Second, the decode logic divides CISC instructions into two categories based on the number of bits that must be considered to determine each instruction's length: instructions with length specified by a small number of bits are aligned in a single phase (halfcycle), whereas other instructions typically require an additional clock phase. Finally, the IAU extracts up to eight bytes from the instruction stream in a single shift, allowing long instructions (up to 15 bytes for i486™) to be aligned in a small number of shift operations, and most instructions to be aligned with a single shift.

The following tasks are carried out by the IAU in order to quickly and accurately decode a CISC instruction:
- detect the presence and the length of prefix bytes;
- isolate the Opcode, ModR/M and SIB (scale, index, base) bytes;
- detect the length of instructions (which indicates the location of the next instruction); and
- send the following information to an Instruction Decode Unit (IDU):
  - Opcode, eight bits plus 3 optional extension bits. For 2 byte opcodes, the first byte is always 0F hex, so the second byte is sent as the opcode.
  - ModR/M byte, SIB byte, and Displacement and Immediate data; and
  - Information concerning the number and type of prefixes.

The opcode byte or bytes specify the operation performed by the instruction. The Mod R/M byte specifies the address form to be used if the instruction refers to an operand in memory. The Mod R/M byte can also refer to a second addressing byte, the SIB (scale, index, base) byte, which may be required to fully specify the addressing form.

2.1 Instruction Alignment Unit Block Diagrams

Figure 3:
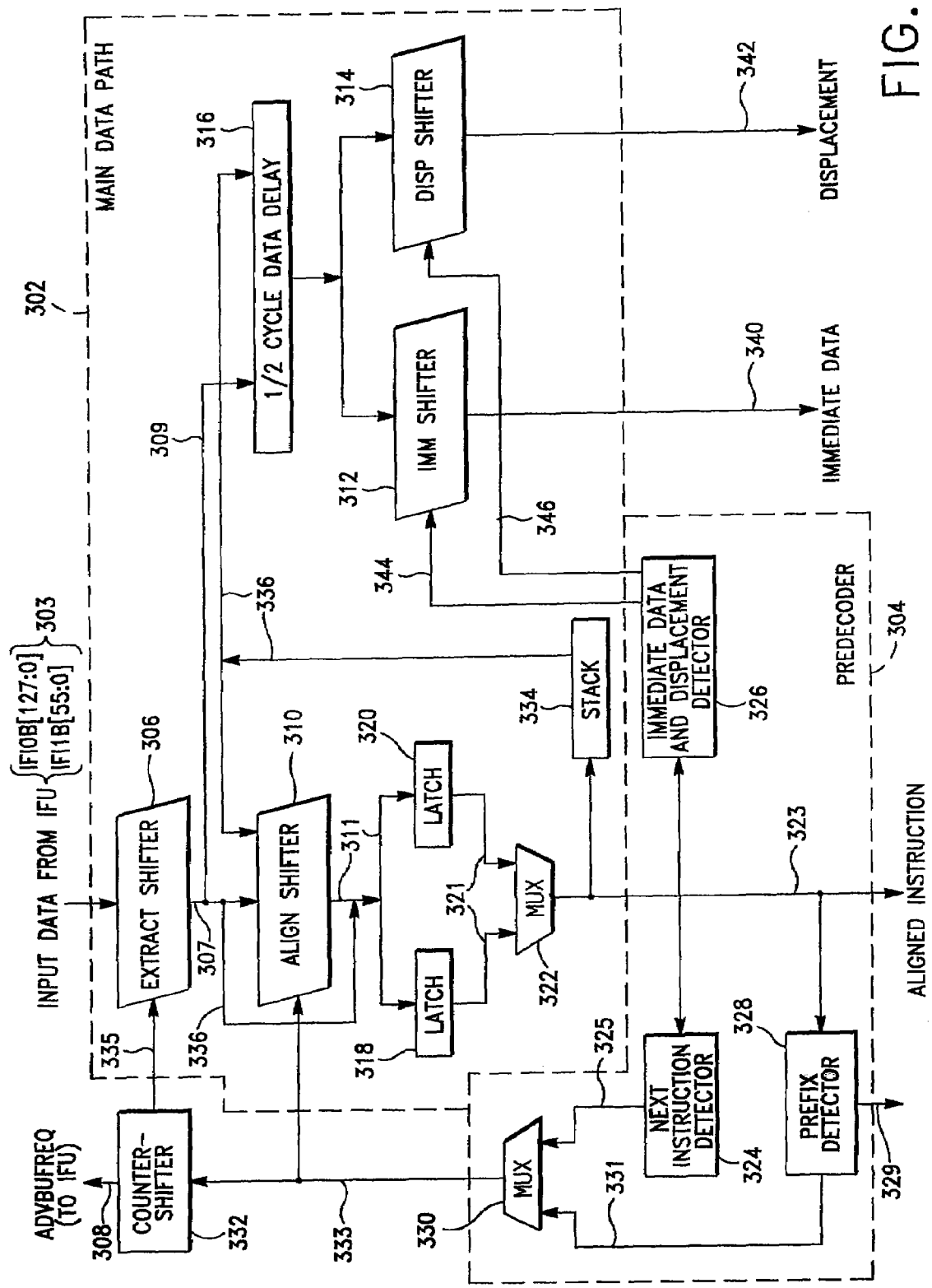
FIG. 3 shows a block diagram of the instruction alignment unit of the present invention.

A block diagram of the IAU is shown in FIG. 3. The diagram is divided into two sections: a MAIN DATAPATH 302 (indicated by the dashed line box) and a PREDECODER 304 (indicated by the dashed line box). Instruction shifting and extraction occurs in the MAIN DATAPATH 302, while length determination and datapath control are handled by the PREDECODER 304.

The MAIN DATAPATH 302 comprises several shifters, latches and multiplexers. An EXTRACT SHIFTER 306 receives instruction data arranged in bytes from the IFU. Two buses (shown generally at 303) IFI0b_Bus[127:0] and IFI1b_Bus[55:0] represent instruction data outputs of the IFU. The IFU updates this instruction information in response to requests from the IAU on an ADVance BUFfer REQuest (ADVBUFREQ) line 308. Generation of the ADVBUFREQ signal will be discussed below. Eight bytes of data, corresponding to the current instruction, are output from the EXTRACT SHIFTER and are sent to an ALIGN SHIFTER 310 on a bus 307. The ALIGN SHIFTER holds a total of 16 bytes of instruction data and can shift up to 8 bytes per phase. The ALIGN SHIFTER is used to separate prefixes from their instruction if they are detected by shifting them out. The ALIGN SHIFTER is also used to align the instruction to its lower order bytes and shift-out the entire instruction after it has been aligned.

The 8-bytes are also sent via a bus 309 to an IMMediate Data SHIFTER (IMM SHIFTER 312), which extracts immediate data from the current instruction, and to a DISPlacement SHIFTER (DISP SHIFTER 314), which extracts displacement data from the current instruction. Data to these two shifters is delayed by a ½ cycle delay element 316 to keep it synchronized with the aligned instruction.

The ALIGN SHIFTER 310 outputs the next aligned instruction on a bus 311 to two ALIGN_IR latches 318 or 320. These latches operate on opposite phases of the system clock, allowing two instructions to be latched per cycle. The ALIGN_IR latches 318 and 320 output aligned instruction bytes on two output buses 321. During the phase in which one of the latches is receiving a new value, the output of the other latch (which is the current aligned instruction) is selected by a multiplexer (MUX 322). The MUX 322 outputs the current aligned instruction on an aligned instruction bus 323. The output 323 is the primary output of the IAU. This output is used by the PREDECODER 304 to determine the length of the current instruction, and it is fed back into the ALIGN SHIFTER 310 as data from which the next instruction is extracted. The current aligned instruction is fed back to the ALIGN SHIFTER 310 via bus 323, a stack 334 and a further bus 336. The bus 336 also sends the current aligned instruction information to the ½ cycle data delay 316.

The IMM and DISP SHIFTERS 312 and 314, respectively, can therefore shift the immediate and displacement data, because they also require 16 total bytes to shift. The ½ cycle data delay 316 outputs instruction bytes to the shifters on a bus. The IMM SHIFTER 312 outputs immediate data corresponding to the current instruction on an IMMEDIATE DATA bus 340. The DISP SHIFTER 314 outputs displacement data corresponding to the current instruction on a DISPLACEMENT DATA bus 342.

The PREDECODER 304 comprises three decoder blocks: a Next Instruction Detector (NID) 324, an Immediate Data and Displacement Detector (IDDD) 326, and a Prefix Detector (PD) 328. The NID and PD control the ALIGN SHIFTER and the EXTRACT SHIFTER, while the IDDD controls the IMM SHIFTER 312 and the DISP SHIFTER 314.

The PD 328 is designed to detect the presence of prefix bytes in an instruction. It determines the number of prefixes present, and provides shift control signals to the ALIGN SHIFTER 310 and the COUNTER SHIFTER 332 via a line 331, a MUX 330 and a line 333, for extraction of the prefixes from the instruction stream in the next half cycle. In addition, the PD 328 decodes the prefixes themselves and provides this prefix information on an output line 329 to the IDU.

The basic architecture of the PD 328 consists of four identical prefix detection units (to detect up to four prefixes), and a second block of logic to decode the prefixes themselves. The CISC format defines the order in which prefixes can occur, but the present invention checks for the presence of all prefixes in each of the first four byte positions. Furthermore, the functions of detecting the presence of prefixes and decoding the prefixes are separated to take advantage of the reduced speed requirements for the decoder. A more detailed description of the architecture of the PD 328 will be addressed below.

The IDDD 326 is designed to extract immediate data and displacement data from each instruction. The IDDD always attempts to extract both fields, whether they are present or not. The IDDD 326 controls the IMM SHIFTER 312 and the DISP SHIFTER 314 on a pair of lines 344 and 346, respectively. The IDU requires a half cycle to process the aligned instruction, but has no use for the immediate and displacement data. The immediate and displacement data is therefore delayed by the ½ cycle data delay 316 to allow more time for the IDDD 326 to compute shift amounts, because the shift occurs during the following phase, unlike the NID 324 which decodes and shifts in the same phase.

The NID 324 is the heart of the PREDECODER. The NID 324 determines the length of each instruction once the prefixes have been removed. The NID 324 controls the ALIGN SHIFTER 310 and a COUNTER SHIFTER 332 via a control line 325, MUX 330 and line 333. The NID comprises two sub-blocks, a Subset Next Instruction Detector (SNID 702) and a Remaining Next Instruction Detector (RNID 704), which will be discussed in conjunction with FIGS. 7A and 7B.

The SNID 702, as its name implies, determines the lengths of a subset of the CISC instruction set. Instructions in the subset can be aligned at a rate of two per cycle by the SNID.

The RNID 704 determines the lengths of all remaining instructions, and requires an additional half cycle, which brings its total decode time to a full cycle. The determination of whether or not an instruction is in the subset is made by the SNID, and this signal is used within the NID to select the outputs of either the SNID or the RNID.

When a new instruction is being aligned, it is initially assumed to be in the subset, and thus the output of the SNID is selected. If the SNID determines (during this same half-cycle) that the instruction must be handled by the RNID, a signal is asserted and the IAU loops the current instruction to hold it for another half-cycle. During this second half-cycle, the RNID output is selected, and the instruction is properly aligned.

This architecture of the NID has several benefits. One, which was mentioned earlier, is that the selection between the SNID and the RNID can be made during a single half cycle if the cycle time is sufficiently long, allowing all instructions to be aligned in a single phase (not including the time to extract prefixes and instructions longer than eight bytes). This provides a per-cycle performance increase at lower cycle rates, without additional hardware.

A second advantage is that the selection signal can be used as an alignment cancel signal, because it causes the IAU to ignore the SNID shift outputs and hold the current instruction for an additional half cycle. The SNID could be designed to predict certain instruction combinations or lengths, and then generate the cancel signal if these predictions were incorrect. This could be used to align multiple instructions in a single half cycle, for example, which would further boost performance.

The IAU also comprises a COUNTER SHIFTER 332. The COUNTER SHIFTER 332 is used to determine the shift amount for the EXTRACT SHIFTER 306 via a line 335, and request additional CISC instruction bytes from the IFU using the ADVBUFREQ line 308. The functionality of the COUNTER SHIFTER 332 will best be understood by reviewing the following flow chart of the IAU operation and a timing diagram example.

Figure 4:
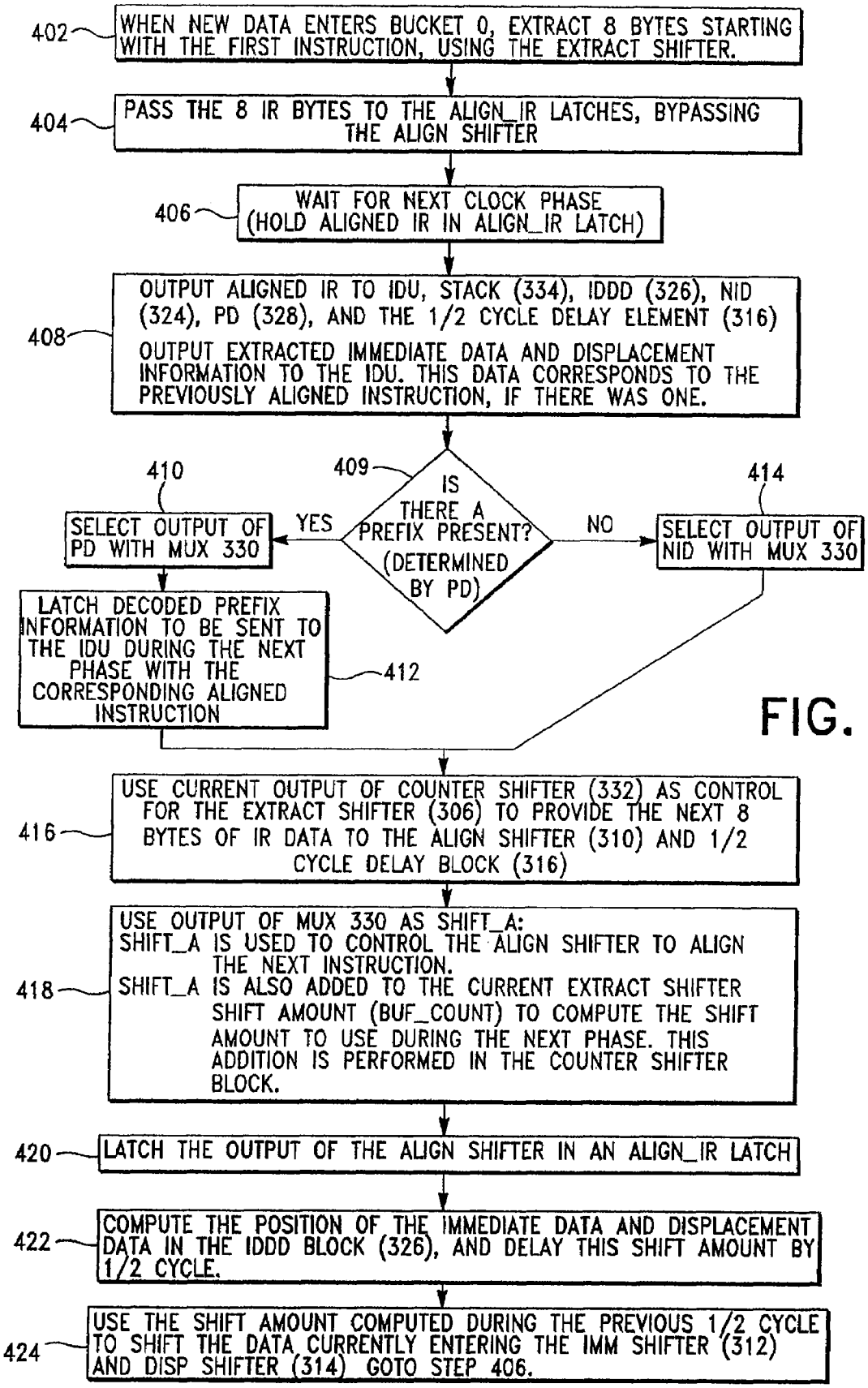
FIG. 4 shows a representative flow chart of the instruction extraction and alignment method of the IAU of the present invention.

FIG. 4 shows a general flow chart of instruction byte extraction and alignment performed by the IAU of the present invention. When new data enters the lowest line 205 of the IFU's MBUF 204 (called BUCKET_#0), the EXTRACT SHIFTER 306 extracts 8 bytes starting with the first instruction, as shown at a step 402. The 8 instruction bytes are passed along to the ALIGN_IR latches 318 and 320, while bypassing the ALIGN SHIFTER 310, as shown at a step 404. The IAU then waits for the next clock phase while it holds the aligned instruction in the ALIGN_IR latch, as shown at a step 406.

During the next clock phase, the IAU outputs the aligned instruction to the IDU, the STACK 334, the IDDD 326, the NID 324, the PD 328 and the ½ cycle data delay 316. The immediate data and displacement information is then output to the IDU on buses 340 and 342, respectively. This data corresponds to the instruction aligned during the previous phase, if there was one. These operations are shown generally at a step 408 of FIG. 4.

A conditional statement 409 is then entered by the IAU to determine if a prefix or prefixes are present. This determination is made by the PD (prefix decoder) 328. If one or more prefixes are detected by the PD, as indicated by a "YES" arrow exiting the conditional statement 409, the process proceeds to a step 410 in which the IAU selects the output of the PD with the MUX 330. The decoded prefix information is then latched to be sent to the IDU during the next phase with the corresponding aligned instruction, as shown at a step 412. If no prefix instruction bytes were detected, as indicated by a "NO" arrow exiting the conditional statement 409, the output of the NID 324 is selected with the MUX 330, as shown at a step 414.

Once the steps 412 or 414 are completed, the current output of the COUNTER SHIFTER 332 is used to control the EXTRACT SHIFTER 306 to provide the next 8 bytes of instruction data to the ALIGN SHIFTER 310 and the ½ cycle delay 316, as shown at a block 416. Next, the IAU uses the output of the MUX 330 as a variable called SHIFT_A, which is used to control the ALIGN SHIFTER 310 to align the next instruction. The SHIFT_A is also added to the current EXTRACT SHIFTER shift amount (called BUF_COUNT) to compute the shift amount for use during the next phase. This addition is performed in the COUNTER SHIFTER 308, as shown at a step 418.

The next operational step performed by the IAU is to latch the output of the ALIGN SHIFTER in the ALIGN_IR latch, as shown at a step 420. The position of the immediate data and displacement data in the IDDD 326 is then computed, and this shift amount is delayed by a ½ cycle, as shown at a step 422. Next, the IAU uses the shift amount computed during the previous half cycle to shift the data currently entering the IMM SHIFTER 312 and DISP SHIFTER 314, as shown at a step 424. Finally, the process repeats beginning at step 406 to wait for the next clock phase. The steps 408 through 424 are repeated for the remaining instruction bytes in the instruction stream.

Figure 5:
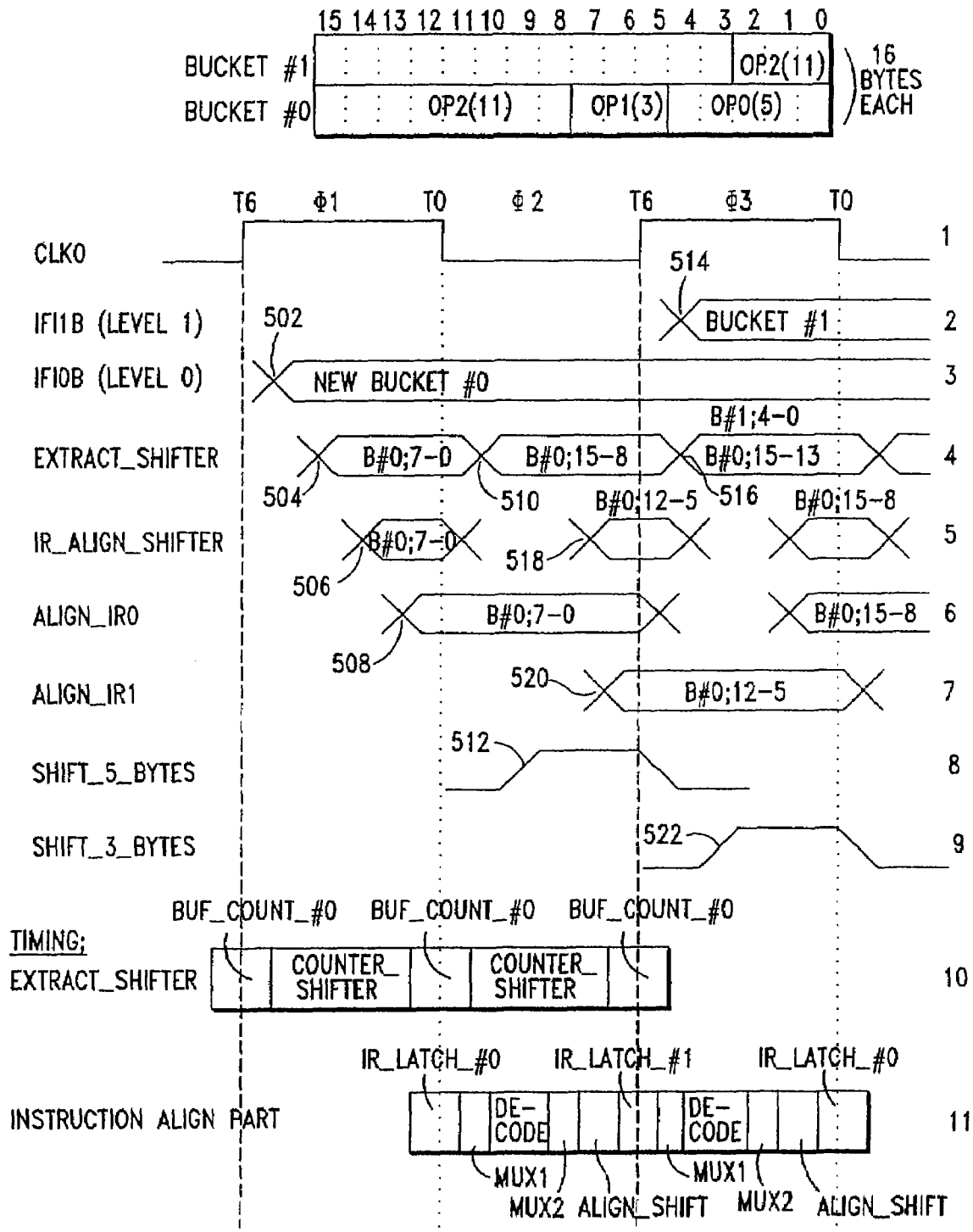
FIG. 5 shows a simplified timing diagram associated with the block diagram of FIG. 3 and the flow chart of FIG. 4.

FIG. 5 shows a timing diagram associated with the IAU of FIG. 3. Two instruction buckets are shown at the top of FIG. 5. These instruction buckets, labeled BUCKET_#0 and BUCKET_#1, each comprise 16 instruction bytes which are provided by the IFU (from an instruction memory not shown) to the IAU in FIG. 3. Instruction alignment is always done from the right out of BUCKET_#0, (i.e., the bottom bucket). In this example, BUCKET_#0 and BUCKET_#1 are the bottom two buckets of the IFU's MBUF 204. Other arrangements are also possible.

In this example, the first three instructions sent to the IAU are OP0, OP1, and OP2, which have lengths of 5 bytes, 3 bytes and 11 bytes, respectively. Note that only the first 8 bytes of instruction OP2 fit in BUCKET_#0. The remaining 3 bytes wrap to the beginning of BUCKET_#1. To simplify this example, it is assumed that these three instructions have no prefix bytes. An additional phase would be required for the alignment of an instruction if prefixes are detected.

Instructions can start at any position of a bucket. Instructions are extracted up to 8 bytes at a time from the bottom bucket beginning with any instruction in that bucket. The IAU looks at two buckets to accommodate instructions which extend into the second bucket, such as OP2 in the present example.

Trace "1" in the timing diagram is one of two system clocks CLK0. In this example, the system clock has a 6 nano second (ns) half cycle. CLK0, which has opposite phase compared to the other system clock CLK1, rises at T6 and falls at T0, where T0 is the rising edge of CLK1 and T6 is the rising edge of CLK0. The three main clock phases of FIG. 5 have been labeled φ1, φ2 and φ3 to aid this discussion.

Traces "2" and "3" in the timing diagram represent instruction data on the input buses IFI1B and IFI0B. A new BUCKET_#0 becomes available on bus IFI0B at the beginning of φ1, as shown at 502. A short time later, the first 8 bytes starting with OP0 (13#0; 7-0) are extracted by the EXTRACT SHIFTER 306 at 504. BUCKET_#0 bytes 7-0 are shown valid. The EXTRACT SHIFTER timing is shown at a trace "4".

When CISC to RISC decoding of an instruction stream begins, the COUNTER SHIFTER 332 controls the EXTRACT SHIFTER 306 to extract the first 8 bytes from Bucket_#0. The COUNTER SHIFTER signals the EXTRACT SHIFTER to shift and extract further bytes of the buckets as the alignment of instructions progresses. When Bucket #0 is depleted of instruction bytes, the contents of Bucket_#1 are shifted into Bucket #0 and Bucket_#1 is refilled from the instruction stream. After the initial extraction of 8 bytes, the EXTRACT SHIFTER extracts and shifts bytes under control of the COUNTER SHIFTER on line 335, based on instruction length, prefix length and previous shift information.

For this example, however, the COUNTER SHIFTER signals the EXTRACT SHIFTER to shift zero to align the first instruction. Thus, the EXTRACT SHIFTER shifts-out the first 8 bytes of the first instruction to the ALIGN SHIFTER 310. The timing of signals at the ALIGN SHIFTER are shown at trace "5" of the timing diagram. These 8 bytes become valid at the ALIGN SHIFTER during φ1 at the time period shown by a reference numeral 506.

The first 8 bytes of Bucket_#0 bypass the ALIGN SHIFTER and are stored in the two ALIGN_IR latches 318 or 320 (as shown at traces "6" and "7" in FIG. 3). The ALIGN_IR latches receive the instruction bytes in an alternating fashion, based on the timing of clock signals CLK0 and CLK1. ALIGN_IR0 318 is a clock signal CLK0 latch, meaning that it is latched while clock signal CLK0 is high. ALIGN_IR1 320 is a clock signal CLK1 latch, which latches when clock signal CLK0 is high. The first 8 bytes become valid at the ALIGN_IR0 prior to the end of the first clock signal CLK0 phase, as shown by a reference numeral 508 toward the end of φ1.

The MUX 322 selects the latch that was latching during the previous phase. Thus, in this example, MUX 322 outputs the first eight bytes of OP0 during the second full phase, φ2.

The first 8 bytes of OP0 then flow to the NID 324 and the STACK 334. The NID 324 detects that the first instruction is 5 bytes long and sends this information back to the ALIGN SHIFTER and to the COUNTER SHIFTER via lie 325, MUX 330 and line 333. At the same time the first 8 bytes flow through the stack and are fed back to the ALIGN SHIFTER, as discussed above. Thus, the ALIGN SHIFTER receives instruction bytes from the EXTRACT SHIFTER, and itself, indirectly. This is because the ALIGN SHIFTER needs 16 bytes of input in order to shift a maximum of 8 bytes per cycle. When the ALIGN SHIFTER shifts right X number of bytes, it discards the least significant X number of bytes, and passes the next 8 bytes of data to the latches 318 and 320. In this case, the STACK 334 provides bytes 0-7 to the ALIGN SHIFTER 310.

A bypass 336 around the ALIGN SHIFTER is used in the initial case when the EXTRACT SHIFTER extracts the first instruction from the instruction stream. It is not necessary for the ALIGN SHIFTER to shift in the initial case, because, excluding prefix bytes, the first instruction is aligned.

During φ2 of the timing diagram, the EXTRACT SHIFTER shifts out 8 bytes, bytes 15-8 of BUCKET_#0. See 510 at FIG. 5. These bytes are sent to the ALIGN SHIFTER, which now has a total of 16 consecutive bytes to work with. The ALIGN SHIFTER looks at the output of the EXTRACT SHIFTER and the valid output of the latches 318 and 320 during φ2.

Toward the end of φ2, the ALIGN SHIFTER shifts bytes 12-5 of BUCKET_#0 to its outputs, based on the signal from the NID, which indicated to the ALIGN SHIFTER to shift 5 bytes to the right, thereby discarding the 5 least significant bytes corresponding to instruction OP0. See the Shift_5_byte signal 512 at trace "8" in the timing diagram. The 8 bytes of remaining instruction data, bytes 12-5, then flow through the ALIGN SHIFTER. Note that byte 5 is the first byte of the next instruction, OP1.

The COUNTER SHIFTER 332 then shifts the EXTRACT SHIFTER 306 8 bytes, because the first 8 bytes are now available from the ALIGN_IR latches, thus the next bytes are needed. Beginning at phase 3, the COUNTER SHIFTER will signal the EXTRACT SHIFTER to increase its shift amount by the number of bytes shifted out by the ALIGN SHIFTER 310 during the previous phase. The COUNTER SHIFTER must therefore comprise logic to store the previous EXTRACT SHIFTER shift amount, and add the ALIGN SHIFTER shift amount to this value.

Each time there is a new value for the ALIGN SHIFTER, the COUNTER SHIFTER adds that amount to its old shift amount. In this example, it shifted 8 bytes during φ2. Therefore, in φ3, it must tell the EXTRACT SHIFTER to shift 8+5, or 13 bytes. The bytes output by the EXTRACT SHIFTER are bytes 20-13. Note that the ALIGN_IR latches will output bytes 12-5 during φ3; and therefore, bytes 20-5 will be available at the ALIGN SHIFTER During φ3, the EXTRACT SHIFTER will output bytes 20-13. However, BUCKET_#0 only contains bytes 15-0, therefore, bytes 20-16 must be taken from BUCKET_#1. As shown at 514 in the timing diagram, BUCKET_#1 becomes valid at the beginning of φ3. The EXTRACT SHIFTER then shifts bytes 4-0 of BUCKET_#1 and bytes 15-13 of BUCKET_#, as shown at 516. If BUCKET_#1 was not valid at this time, the IAU would have to wait until it becomes valid.

As noted above, the Shift_5_ byte signal was generated by the NID during φ2. Based on this signal, bytes 12-5 of BUCKET_#0 are shifted out by the ALIGN SHIFTER, as shown at 518, and shortly thereafter are latched into ALIGN_IR1, as shown at 520.

Bytes 12-5 are sent to the STACK 334 and the NID 324 by the MUX 322 at the beginning of φ3. The STACK feeds bytes 12-5 back to the ALIGN SHIFTER as shown at 336, and the NID determines the length of OP1 to be 3 bytes and outputs the Shift_3_bytes signal during the latter half of φ3, as shown in trace "9" at 522. The ALIGN SHIFTER shifts 3 bytes (15-8), and this amount is added to the COUNTER SHIFTER.

The above process then repeats. Once an instruction advances beyond BUCKET_#0 (i.e., BUCKET_#0 is completely used), BUCKET #1 will become BUCKET_#0 and a new BUCKET_#1 will later become valid.

Trace "10" in the timing diagram shows the timing for extraction of bytes from the instruction stream. The Buf_Count#0 blocks represent the stored extract shift amount. During each phase the aligned shift amount is added to Buf_Count#0, and the result becomes the extract shift amount during the next phase (see the blocks labeled COUNTER_SHIFT).

Trace "11" in the timing diagram shows instruction alignment timing. The blocks labeled IR_Latch_#0 and IR_Latch_#1 represent the time during which the instructions in the corresponding ALIGN_IR latch become valid. The small blocks labeled MUX1 represent the time when the MUX 322 begins to select the valid align latch. The small blocks labeled MUX2 represent the time when the MUX 330 begins to select the shift amount determined by the NID 324. Finally, the blocks labeled ALIGN_SHIFT represent the time when the ALIGN SHIFTER begins to output the instruction.

Prefixes are extracted using the same technique by which instructions are aligned, but the output of PD 328 is selected by MUX 330 rather than the output of NID 324.

Figure 6:
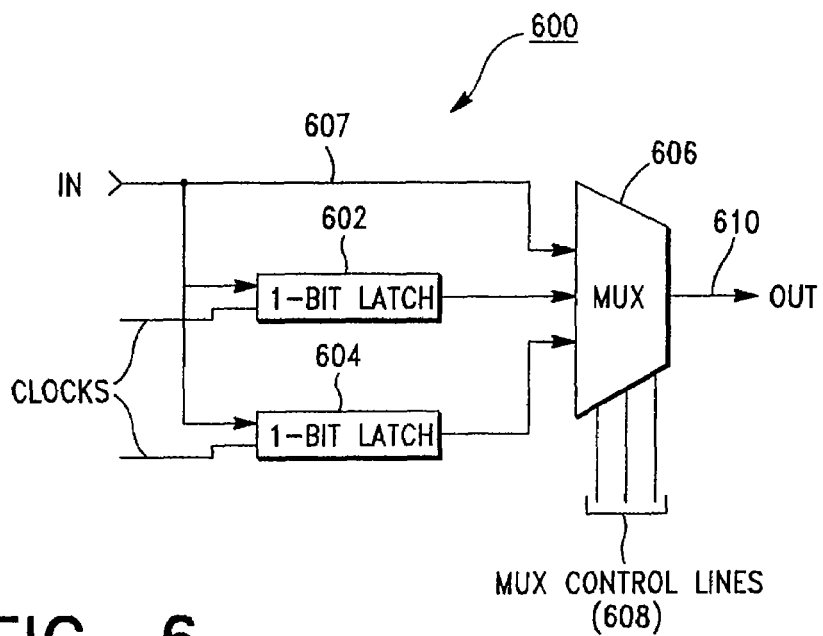
FIG. 6 is a block diagram of the STACK of the present invention.

A block diagram of a section of the STACK 334 is shown in FIG. 6. The STACK comprises 64 1-bit stacks that are arranged in parallel. Each 1 bit stack 600 comprises two latches 602 and 604, and a three input MUX 606. The aligned instructions are input to the latches and the MUX on a bus 607 labeled IN. The loading of the two latches may be done independently on either clock phase. In addition, the MUX 606 has three MUX control lines 608 to select the output of either latch, or bypass the IN data directly to an output 610 labeled OUT.

The IAU may periodically transfer to a different instruction stream. The STACK allows the IAU to store two sets of 8 bytes of instruction data from the MUX 322. This feature is generally used during CISC instruction emulation. When the IAU must branch to process a microcode routine for emulation of a complex CISC instruction, the state of the IAU can be stored and re-initiated once the emulation of the CISC instruction is completed.

The ½ cycle data delay 316 is used to delay the immediate data and displacement information. Placing the delay in the IAU before the shifters pipelines the immediate data and displacement logic in order to do the shift during the following phase, rather than determining the instruction length and the shift in the same half cycle. The operations can be spread across the cycle, thus making the timing requirement easier to meet for that logic. The IDDD block 326 controls the IMM Shifter 312 and the DISP Shifter 314 to extract the immediate data and displacement data from the instructions. For example, if the first 3 bytes of the instruction are opcode, followed by 4 bytes of displacement and 4 bytes of immediate data, the shifters would be enabled to shift out the appropriate bytes.

The shifters 312 and 314 always output 32 bits whether the actual data size is 8, 16 or 32 bits, with the immediate and displacement data appropriately aligned to the low order bits of the 32 bit output. The IDU determines whether the immediate and displacement data is valid, and if so, how much of the data is valid.

The determination of the length of any prefixes, immediate data, displacement data, and the actual length of the instructions is a function of the actual CISC instruction set being aligned and decoded. This information may be obtained by one skilled in the art by studying the CISC instruction set itself, the manufacture's user manuals, or other common reference material. Those skilled in the art will readily recognize how to accomplish this, as well as how to convert the information into random logic to implement the above described IAU subsystem, the IDU subsystem described below, and how to generate the control logic and signals used to control data flow.

Furthermore, once such random logic is generated, commercially available engineering software applications (e.g., Verilog manufactured by Cadence Design Systems, Inc., San Jose, Calif.), may be used to verify the logic, and can aid in defining the timing and generation of the control signals and associated random logic. Other commercially available engineering software applications are available to generate gate and cell layouts to optimize the implementation of the functional blocks and control logic.

The i486™ instruction set supports 11 prefixes that have a defined order when used together in an instruction. The format defines that up to four prefixes can be included in a single instruction. Thus, the PREFIX DETECTOR 328 of the present invention comprises four identical prefix detect circuits. Each circuit looks for any of the 11 prefix codes. The first four bytes passed to the prefix detector are evaluated, and the outputs of the four prefix detect circuits are combined to determine the total number of prefixes present. The result is used as the shift amount that is passed through the MUX 330.

Figure 7A:
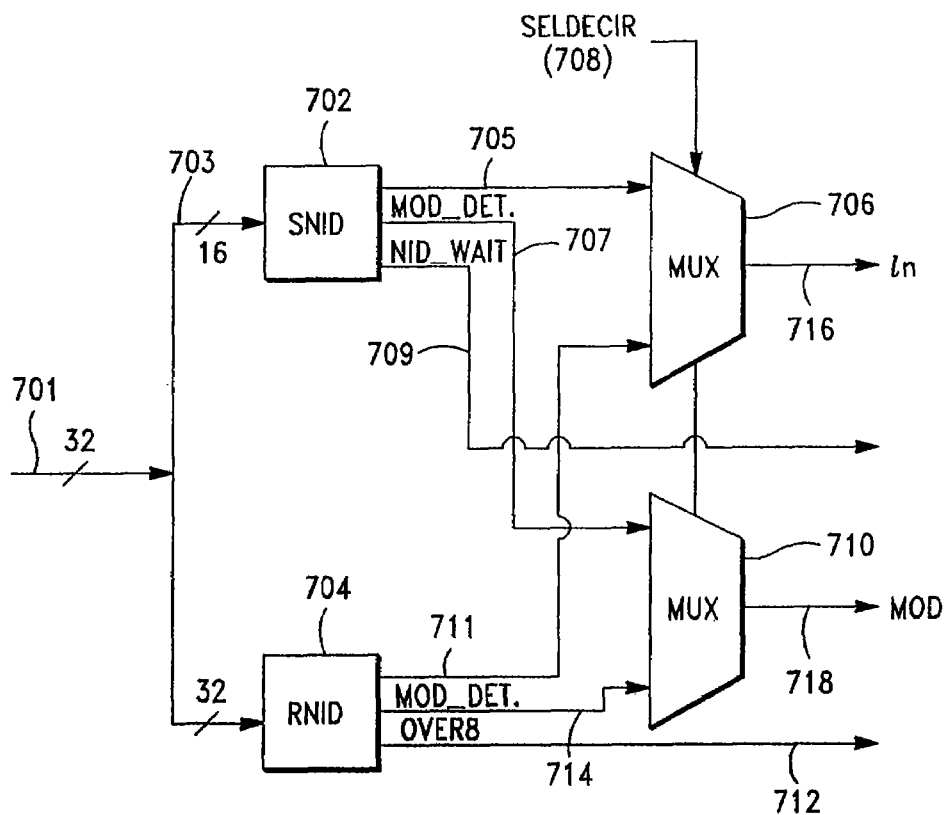
FIG. 7A is a block diagram of the Next Instruction Decoder (NID) of the present invention.

A block diagram of the NID is shown in FIG. 7A. The following discussion of the NID is specific to alignment of i486™ instructions. Alignment of other CISC instructions would likely employ a different NID architecture. The techniques discussed below should therefore serve as a guide to those skilled in the art, but should not be considered to limit the scope of the present invention.

Only 4 bytes are required to determine the length of an instruction. (As noted above, the 4 bytes comprise two Opcode bytes, an optional ModR/M byte and a SIB byte.)

FIG. 7A shows a 4 byte (32 bit) bus 701 representing the first 4 bytes of an instruction received from the MUX 322. The first 2 bytes are sent to the SNID 702 on a bus 703. The SNID determines the length of a first subset of instructions that are, by definition, identifiable based on the first 2 bytes. The SNID can determine the length of this subset of instructions in a half cycle. The length of the subset instructions is output by the SNID on a bus 705. The width of the bus may correspond to the maximum number of instruction bytes detected by the SNID. The SNID also has a 1 bit MOD DETect (MOD_DET) output line 707 to indicate whether a ModR/M byte is present in the instruction. In addition, the SNID has a 1 bit NID_WAIT line 709 to signal the control logic that the instruction is not in the subset (i.e., use the RNID's output instead). The IAU must therefore wait a half cycle for the RNID to decode the instruction if NID_WAIT is true.

The subset of instructions decoded by the SNID are those CISC instructions that can be decoded in a half cycle using a minimum of 1, 2 and 3 input gates (NANDs, NORs and invertors), with a maximum of 5 gate delays based on an 16×16 Karnaugh map of the 256 instructions. Blocks of the map including most 1 byte opcode instructions can be implemented in this fashion. The remainder of the instructions are decoded by the RNID using a logic array with a longer gate delay.

The RNID 704 receives the first 4 bytes on the bus 701. The RNID performs length determination decoding for the remaining instructions that requires more that one phase to decode. The RNID has outputs that are similar to the outputs of the SNID.

The RNID detects instruction lengths and outputs the result on a bus 711. A 1 bit OVER8 output 712 indicates that the instruction is over 8 bytes in length. The RNID also has a 1 bit MOD_DET output 714 that indicates whether the instruction includes a ModR/M byte.

The length decoded by either the SNID or the RNID is selected by a MUX 706. A control line 708 for the MUX 706, called SELect_DECoder for current InstRuction (SEL-DECIR), switches the MUX 706 between the two decoders to get the actual length which is 1 to 11 bytes. An 11 byte-long instruction, for example, would cause the RNID to output the OVER8 signal and a 3 on bus 711. The instruction length (ln) is sent to the MUX 330 on a bus 716, and is used by the ALIGN SHIFTER 310 and the COUNTER SHIFTER 332. The 8 bits output by the top MUX 706 are used as shift controls (enables) for the ALIGN and COUNTER SHIFTERs.

The ModR/M bytes are also selected in a similar fashion. The SELDECIR signal 708 controls a second MUX 710 to choose the appropriate MOD line to indicate whether a ModR/M byte is present. The MOD line output 718 is used by the IDDD.

The SELDECIR signal 708 is generated based on the NID_WAIT signal 709. The output of the SNID is selected during the first clock phase because those results will be complete. If the NID_WAIT signal 709 indicates that the instruction was not decoded, the MUXs 706 and 710 are switched to select the output 711 of the RNID, which will become available at the beginning of the next clock phase.

The RNID 704 essentially comprises two parallel decoders, one decodes the instructions as if there is a 1 byte opcode and the other decodes as if there is a 2 byte opcode. An ESCape DETect (ESC_DET) input signal indicates whether the opcode is 1 byte or 2 bytes in length. For example, in the i486™ instruction set, the first byte in all 2 byte opcodes (called the ESCAPE byte) has the value 0F hex that indicates the instruction has a 2 byte opcode. The RNID outputs a valid instruction length based on an ESC_DET signal. This signal indicates that the first opcode byte is an ESCAPE (0F hex), which indicates a 2 byte opcode, thereby enabling the second byte decoder. Decoding logic for generating the ESC-DET signal should be evident to those skilled in the art.

Figure 7B:
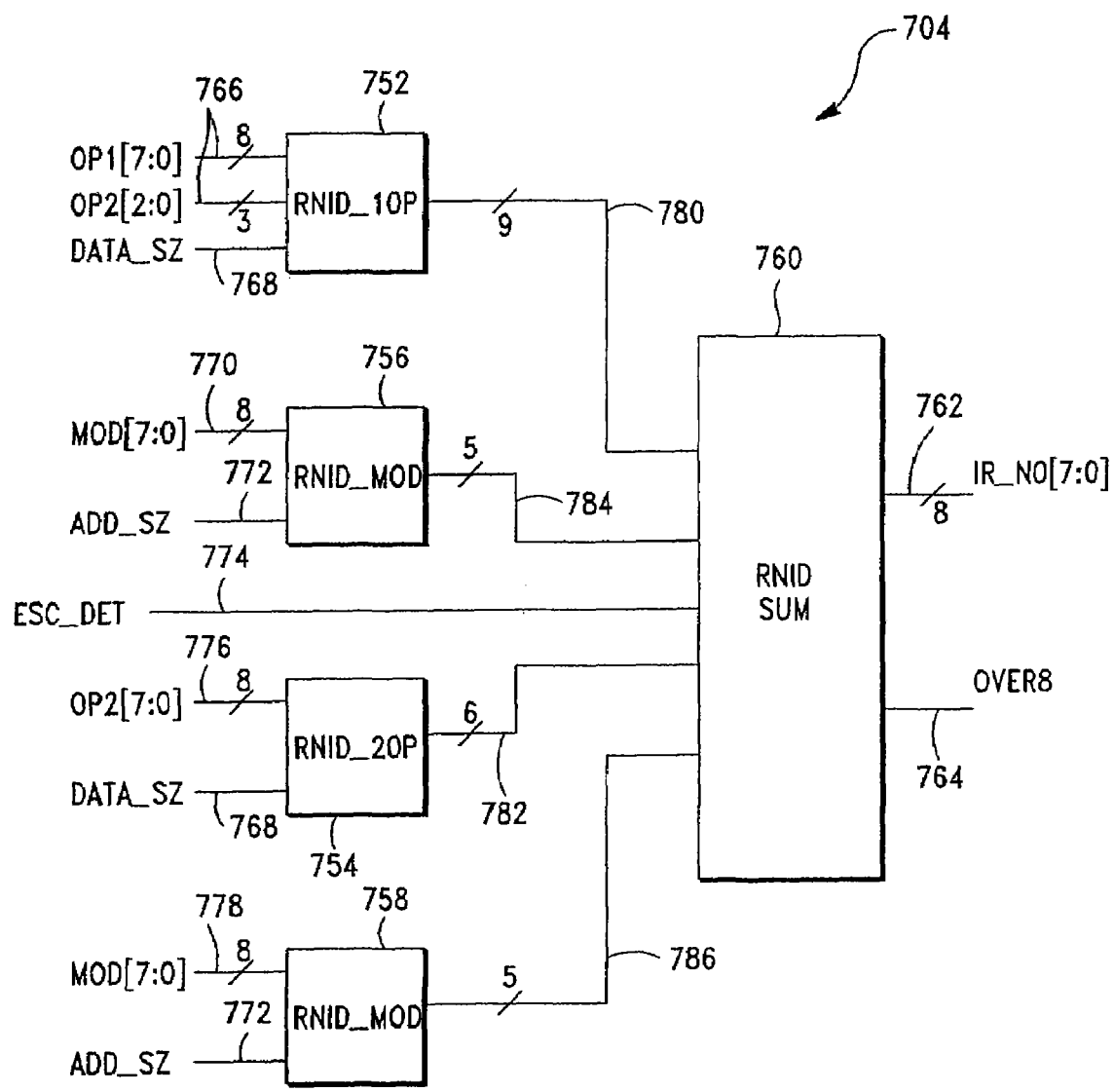
FIG. 7B is a block diagram of the Remaining Next Instruction Decoder (RNID) of the present invention.

A block diagram of the RNID is shown in FIG. 7B. The RNID comprises an RNID_1OP decoder 752, which decodes the first opcode byte, an RNID_2OP decoder 754, which decodes the second opcode byte, two identical RNID_MOD decoders 756 and 758, which decode the ModR/M bytes in either of the two positions determined by the number of opcode bytes present, and an RNID_SUM summer 760.

Based on the outputs of the four RNID decoders 752-758, the RNID_SUM summer 760 outputs the total length of the instruction on a bus 762. The RNID_SUM summer 760 has an additional output line 764 labeled OVER8, to indicate whether the instruction is over 8 bytes in length.

The first opcode byte of the instruction and 3 bits (bits [5:3] called extension bits) of the ModR/M byte are input to the RNID_1OP 752 on a bus 766. A further input line 768 called DATA_SZ to the RNID_1OP indicates whether the operand size of the instruction is 16 or 32 bits. The data size is determined based on the memory protection scheme used, and whether prefixes are present to override the default data size. RNID_1OP assumes that the instruction has a 1 byte opcode, and based on that information and the 3 extension bits, RNID_1OP attempts to determine the length of the instruction.

The RNID_MOD decoder 754 decodes the ModR/M byte of the instruction input on a bus 770. The RNID_MOD decoder has an additional input bus 772 labeled ADD_SZ, which indicates whether the address size is 16 or 32 bits. The address size is independent of the data size.

The ESC_DET signal 774 is also input to block 760. When the ESC_DET signal is logic HIGH, for example, the RNID_SUM block knows that the opcode is actually in the second byte.

The RNID_2OP decoder 754 assumes that the opcode is 2 bytes, and therefore decodes the second byte (see bus 776) of the opcode. RNID_2OP decoder also has the input 768 identifying the data size.

Since the decoders themselves do not know the length of the opcode, i.e., 1 or 2 bytes, and since the ModR/M byte always follows the opcode, the second RNID_MOD decoder 758 is used to decode the byte (see bus 778) following the 2 byte opcode, again assuming that it is there. The two RNID_MOD decoders are identical, but decode different bytes in the instruction stream.

Again, based on the ESC_DET signal 774, the RNID_SUM 760 selects the outputs of the appropriate opcode and ModR/M byte decoders, and outputs the length of the instruction on bus 762. The output 764 labeled OVER8 indicates whether the instruction is over 8 bytes. If the instruction is over 8-bytes in length, the IR_NO[7:0] bus 762 indicates the number of instruction bytes over 8.

The RNID_1OP decoder 752 has an output bus 780 that is 9 bits wide. One line indicates whether the instruction is 1 byte long. The second line indicates that the instruction is 1 byte long and that a ModR/M byte is present, and thus, information from the ModR/M decoder should be included in the determination of the length of the instruction. Similarly, the remaining output lines of bus 780 indicate the following number of bytes: 2, 2/MOD, 3, 3/MOD, 4, 5, and 5/MOD. If the instruction is 4-bytes long there cannot be a ModR/M byte; this is inherent in the i486™ instruction set. However, the present invention is in no way limited to any specific CISC instruction set. Those skilled in the art will be able to apply the features of the present invention to align and decode any CISC instruction set.

The RNID_2OP decoder 754 has an output bus 782 that is 6 bits wide. One line indicates whether the instruction is 1 byte long. The second line indicates that the instruction is 1 byte long and includes a ModR/M byte, which should be included in the determination of the length of the instruction. Similarly, the remaining output lines of bus 782 indicate that there are 2, 2/MOD, 3, and 5/MOD. There are no other possible instruction lengths supported by the i486™ instruction set if the opcode is 2 bytes long.

Outputs 784 and 786 of the two RNID_MOD decoders 756 and 758 indicate to the RNID_SUM 760 the five possible additional lengths that can be specified by the ModR/M byte. Each RNID_MOD decoder has a 5 bit wide output bus. The five possible additional lengths are: 1, 2, 3, 5 and 6-bytes. The ModR/M byte itself is included in the total length determination. Any remaining bytes comprise immediate or displacement data.

Figure 8:
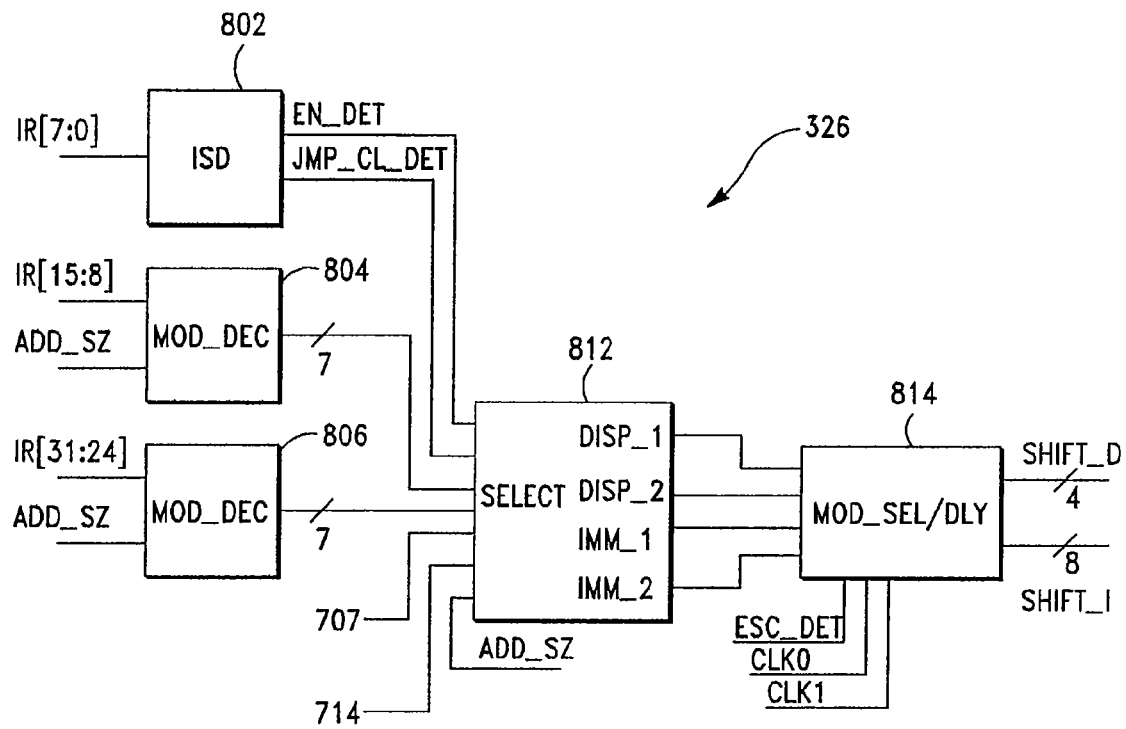
FIG. 8 is a block diagram of the Immediate Data and Displacement Decoder (IDDD) of the present invention.

FIG. 8 shows a block diagram of the IDDD 326. The IDDD determines the shift amounts for the IMM SHIFTER 312 and the DISP SHIFTER 314. The shift amount is determined by the ModR/M byte of the instruction.

The i486™ instruction set includes two special instructions, the enter_detect and jump_call_detect instructions. The IDDD therefore has a block called the Immediate Special Detector (ISD) 802 to handle decoding of these instructions. An input 803 to the ISD is the first byte of the instruction. Two output lines EN_DET and JMP_CL_DET (820 and 822, respectively) indicate whether one of the corresponding instructions is detected.

MOD_DEC decoders 804 and 806 are identical and decode the immediate and displacement data. Based on ADD_SZ 772, decoder 804 looks at the ModR/M byte assuming a 1 byte opcode and decoder 806 looks at the ModR/M byte assuming a 2 byte. The instruction byte inputs to MOD_DEC 804 and 806 are 805 and 807, respectively. These decoders determine the displacement position and the immediate data position in the instruction stream. Two seven line outputs 824 and 826 indicate at what position the displacement and immediate data starts: the displacement can start at position two or position three; and immediate data can start at position two, three, four, six or seven.

The MOD_DET lines 707 and 714 are also input to the SELECT block 812.

The SELECT block 812 combines the EN_DET and JMP_CL_DET signals, the MOD_DET and MOD_DEC results, and the ADD_SZ and outputs its results on four buses 832-838. A DISPlacement 1 (DISP_1) bus 832 outputs the displacement shift results assuming a 1 byte opcode. A DISPlacement 2 (DISP_2) bus 834 outputs the displacement shift results assuming a 2 byte opcode. IMMediate 1 and 2 (IMM_1 and IMM_2) buses 836 and 838 output the immediate data shift information assuming a 1 byte and a 2 byte opcode, respectively A last block 814 labeled MOD_SEL/DLY actually selects the appropriate shift amounts and delays these results a half cycle. The halfcycle delay performed by MOD_SEL/DLY 816 represents the delay 316 shown in FIG. 3. The ESC_DET signal 774 described above is used by the MOD_SEL/DLY block to perform the shift selection. The results are clocked out of the MOD_SEL/DLY 814 by the clock signals CLK0 and CLK1 after a half cycle delay. The immediate data shift control signal and the displacement shift control signal are sent to the DISP SHIFTER and the IMM SHIFTER via a SHIFT_D[3:0] bus 840 and a SHIFT_I[7:0] bus 842, respectively. The number of possible positions within the CISC instruction of the immediate and displacement data define the number of bits required to specify the amount of shift.

Figure 9:
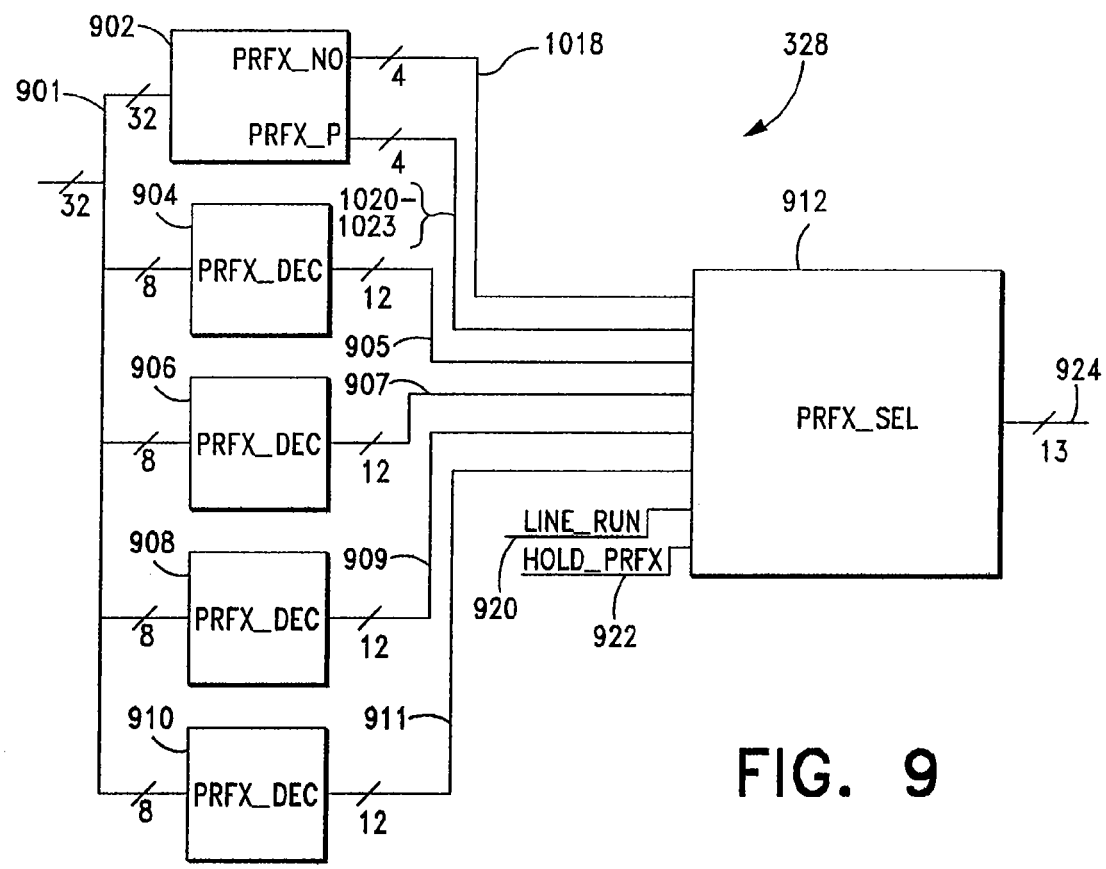
FIG. 9 is a block diagram of a Prefix Decoder (PD) of the present invention.

A block diagram of the PREFIX DETECTOR 328 is shown in FIG. 9. The PREFIX DETECTOR 328 comprises a Prefix_Number decoder (PRFX_NO) 902, four Prefix_Detector decoders (PRFX_DECs 904-910), and a Prefix_Decoder (PRFX_SEL) 912.

The i486™ instruction set, for example, includes 11 possible prefixes. Four total prefixes can be included per instruction, because there are several invalid prefix combinations. The ordering of the four prefixes is also defined by the instruction set. However, rather than detect only the legitimate prefix permutations, the PREFIX DETECTOR uses the four prefix detectors 904-910 to decode each of the first 4 bytes of the instruction. The first 4 bytes of the instruction are input to the PREFIX DETECTOR on a bus 901. Each detector 904-910 has an output bus (905, 907, 909 and 911, respectively) that is 12 bits wide. The 12 outputs indicate which prefix(es) are present, if any are actually decoded at all. The twelfth prefix is called UNLOCK, which is the functional complement of the i486™ LOCK prefix, and is only available to microcode routines during emulation mode.

An ALIGN_RUN control signal 920 may be included to enable/disable the prefix decoder, and can be used to mask-out all of the prefixes. A HOLD_PRFX control signal 922 is used to latch and hold the prefix information. Generally, for alignment of an instruction if the PREFIX DETECTOR 328 indicates that there are prefixes present, the control logic must latch the prefix information. The prefix information is then used by the ALIGN SHIFTER 310 to shift-out the prefixes. In the following cycle, the IAU determines the length of the instruction, aligns it, and passes it to the IDU.

Figure 10:
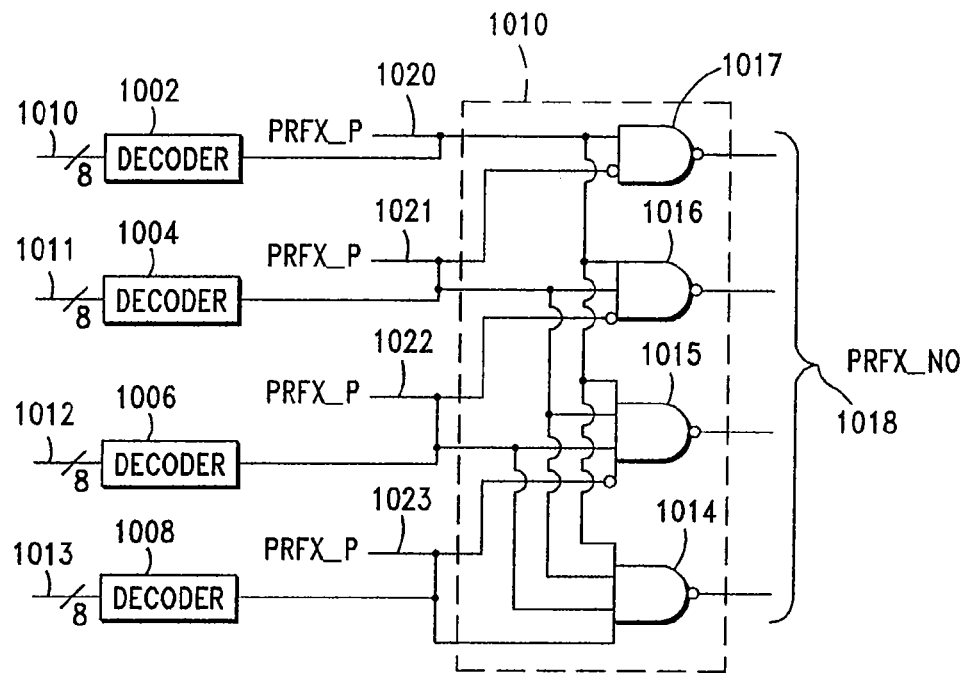
FIG. 10 is a block diagram of the PReFiX Number (PRFX_NO) decoder of the present invention.

The PRFX_NO decoder 902 indicates where and how many prefixes are present by decoding the first 4 bytes of the opcode. A logic diagram of the PRFX_NO decoder 902 is shown in FIG. 10. The PRFX_NO decoder comprises four identical decoders 1002-1008 and a set of logic gates 1010. The four decoders 1002-1008 each look at one of the first four bytes (1010-1013) and determine if a prefix is present. Since it is possible for a prefix byte to follow an opcode byte, the logic gates 1010 are used to output a result representing the total number of prefixes before the first opcode byte, because prefixes following an opcode apply only to the next instruction's opcode.

The total number of prefixes is one if the first byte (position) is a prefix and there is no prefix in the second position. As a further example, a prefix in the fourth position does not matter, unless there are prefixes in the first three positions. A logic HIGH (1) output from the bottom NAND 1014 gate indicates that there are four prefixes; a HIGH output from the second last NAND gate 1015 indicates that there are three prefixes, and so on. The four NAND gate outputs are combined to form a PREFIX NO bus 1018 to indicate the total number of valid prefixes that precede the first opcode byte, i.e, the shift amount output of the PREFIX DETECTOR 328.

The PRFX_NO decoder 902 also includes a Prefix_Present (PRFX_P) output bus 1020 (which is also 4 bits wide). Four PRFX_P output lines 1020-1023 indicate whether or not there is a prefix in the given position, regardless of what the other positions output. The PRFX_P outputs are tapped directly off the four decoder (1002-1008) outputs.

The PRFX_NO decoder results (to be discussed in connection with FIG. 10) and the information from the PRFX_DEC detectors 904-910 are combined by the PRFX_SEL decoder 912. The prefix information is combined to form one 13 bit output bus 924 that indicates whether or not there are prefix signals and which prefixes are present.

3.0 Instruction Decode Unit Overview

All instructions are passed from the IAU to an Instruction Decode Unit (IDU), and are directly translated into RISC instructions. All instructions to be executed by the IEU are first processed by the IDU. The IDU determines whether each instruction is an emulated or a basic instruction. If it is emulated, the microcode emulation routine consisting entirely of basic instructions is processed. If the instruction is basic, it is directly translated by hardware into one to four nano-instructions and sent to the IEU. It is these nano-instructions, rather than the original CISC or microcode instructions, that the IEU actually executes.

The partitioning of instructions has two key benefits: the hardware is kept small because it only needs to support simple operations, and bugs are less troublesome because they are more likely to occur in the complex microcode routines, which can easily be changed.

The IDU's microcode routine support hardware in conjunction with the present invention has several features which make it unique. Typically, microcode instructions consist of control bits for the various datapaths present in a processor, with little or no encoding. The microcode of the present invention, in contrast, is a comparatively high-level machine language designed to emulate a specific complex instruction set. Whereas typical microcode is routed directly to a processor's function units, the microcode of the present invention is processed by the same decoder logic that is used for the target CISC (e.g., 80x86) instructions. This gives the microcode of the present invention much better code-density than is achieved by typical microcode, and makes the microcode easier to develop due to its similarity with the target CISC instruction set. Furthermore, the present invention provides hardware support for microcode revisions: part or all of the on-chip ROM-based microcode can be replaced with external RAM-based microcode under software control. (See commonly owned, co-pending application titled, "A ROM With RAM Cell and Cyclic Redundancy Check Circuit", Ser. No. 07/802,816, filed Dec. 6, 1991, the disclosure of which is incorporated herein by reference.)

The microcode routine language is designed to be a set of instructions that can be executed by the RISC core to perform the functions required by all of the complex emulated instructions, plus the various control and maintenance functions associated with exception handling. Although emulated instructions are typically less performance sensitive than non-emulated (basic) instructions, and exceptions, (which are handled by microcode routines) occur infrequently, it is still critical to the overall system throughput that both be handled efficiently. This goal is achieved through the use of various forms of hardware support for the microcode routines. The present invention comprises four areas of hardware support for microcode: dispatch logic, mailboxes, a nano-instruction format, and special instructions.

The microcode dispatch logic controls the efficient transfer of program control from the target CISC instruction stream to a microcode routine and back to the target instruction stream. It is handled with a small amount of hardware, and in a manner that is transparent to the RISC core's Instruction Execution Unit (IEU). (The IEU executes the RISC instructions. The "RISC core" mentioned above is synonymous with the IEU. The details of the IEU are not necessary for one skilled in the art to practice the present invention. The features of the present invention are applicable to RISC processors in general.)

The mailboxes comprise a system of registers used to transfer information from the instruction decode hardware to microcode routines in a systematic way. This allows the hardware to pass instruction operands and similar data to the microcode routines, saving them the task of extracting this data from the instruction.

The nano-instruction format describes the information that passes from the IDU to the IEU. This format was chosen to allow it to be efficiently extracted from the source CISC instructions, but still provide adequate information to the IEU for dependency checking and function unit control.

Finally, the special instructions are a set of additional instructions provided to allow complete control of the RISC hardware and support certain unique emulation tasks in hardware, and are CISC instruction set specific.

3.1 Microcode Dispatch Logic

The first step in dispatching to microcode is to determine the address of the microcode routine. This step has two important requirements: each microcode routine must have a unique starting address, and these addresses must be generated quickly. This is fairly easy to achieve for exception handling routines, since the small number of cases that must be handled allows the hardware to store the addresses as constants and merely select between them. Determining the addresses for emulated instructions is more difficult, however, because there are too many to make storing all the addresses feasible.

The microcode dispatch logic meets the requirements by basing each instruction's dispatch address directly on its opcode. For example, one-byte opcodes are mapped into the address space from 0H to 1FFFH, requiring that the upper three bits of the 16 bit dispatch address be zeroes. These microcode entry points are spaced 64 bytes apart, which requires the six least-significant bits of each entry point address to be zero. This leaves 7 bits undetermined, and they can be taken directly from seven of the opcode bits. Generating the address in this way requires very little logic, as will become evident to those skilled in the art. For example, a multiplexer alone can be used to select the proper bits from the opcode.

Once the dispatch address for a microcode routine has been determined, the microcode must be fetched from memory. Typically, microcode resides in on-chip ROM, but this is not necessarily the case. As detailed in the above referenced application Ser. No. 07/802,816, each entry point is associated with a ROM-invalid bit which indicates whether or not the ROM routine is correct. This bit is fetched in parallel with the ROM access, and functions similarly to a conventional cache-hit indicator. If this bit indicates that the ROM entry is valid, the microcode routine will continue to be fetched from ROM and executed normally. If the bit indicates that the ROM is invalid, however, the microcode is fetched from external memory, such as RAM or the like.

On chip microcode routine addressing is handled by the IDU itself. The IDU generates 16 bit addresses for accesses to the microcode ROM. If the ROM-invalid bit corresponding to the ROM entry being addressed indicates that the microcode is invalid, the address of external microcode residing off-chip in main memory is calculated. A U_Base register holds the upper 16 address bits (called the starting address) of the external microcode residing in main memory. The 16 bit address decoded by the IDU is concatenated with the upper 16 bits in the U_Base register to access the external microcode residing in main memory. If the location of the external microcode residing in main memory is changed, the contents of the U_Base register can be modified to reflect the new main memory location.

This feature allows microcode updates to be performed by replacing certain routines with alternates in external memory, without forcing all microcode to suffer the reduced performance of external memory accesses. It also makes it possible to remove all ROM from the RISC chip and place the entire microcode in external RAM, to reduce the RISC chip's area requirements or to aid in microcode development.

The dispatch logic is also responsible for providing a means for the microcode routine to return to the main instruction stream when its task is finished. To handle this, separate Program Counters (PC's) and instruction buffers are maintained. During normal operation, the main PC determines the address of each CISC instruction in external memory. A section of memory containing these instructions is fetched by the IFU and stored in the MBUF.

When an emulated instruction or exception is detected, the PC value and length of the current instruction are stored in temporary buffers, while the microcode dispatch address is calculated as described above and instructions are fetched from this address into the EBUF. Microcode is executed from the EBUF until a microcode "return" instruction is detected, at which time the preserved PC value is reloaded, and execution continues from the MBUF. Since the MBUF and all other related registers are preserved during the transfer of control to the microcode routine, the transfer back to the CISC program happens very quickly.

There are two return instructions used by microcode routines to support the differences between instruction emulation routines and exception handling routines. When the microcode routine is entered for the purpose of handling an exception, it is important that after the routine is finished, the processor should return to the exact state in which it was interrupted. When the microcode routine is entered for the purpose of emulating an instruction, however, the routine wants to return to the instruction following the emulated instruction. Otherwise, the emulation routine will be executed a second time. These two functions are handled by the use of two return instructions: aret and eret. The aret instruction returns the processor to its state when microcode was entered, while the eret instruction causes the main PC to be updated and control to return to the next instruction in the target stream.

3.2 Mailboxes

For emulation routines to successfully perform the functions of a complex CISC instruction, it is necessary that the microcode have convenient access to the operands referenced by the emulated instruction. In the present invention, this is performed through the use of four mailbox registers. These registers are unique in their use only; they are defined to be the first four of a set of sixteen temporary registers in the integer register file that are available to microcode. Each emulation routine that requires operands or other information from the original instruction can expect to find these values stored in one or more of the mailbox registers upon entry into the routine. When the IDU detects an emulated instruction, it generates instructions which are used by the IEU to load the registers with the values that microcode expects, before execution of the microcode routine itself begins.

For example, consider the emulation of the Load Machine Status Word instruction (lmsw), which specifies any one of the general registers as an operand. Assume the specific instruction to be emulated is lmsw ax, which loads a 16 bit status word from the "ax" register. The same microcode routine is used regardless of the register actually specified in the instruction, so for this instruction mailbox#0 is loaded with the status word before microcode entry. When the IDU detects this instruction, it will generate a mov u0,ax instruction for the IEU to move the status word from the "ax" register to the "u0" register, which is defined to be mailbox #0. After this mov instruction is sent to the IEU, the microcode routine will be fetched and sent. Thus, the microcode can be written as if the emulated instruction were lmsw u0, and it will correctly handle all of the possible operands that may be specified in the original CISC instruction.

3.3 Nano-Instruction Format

Figure 11:
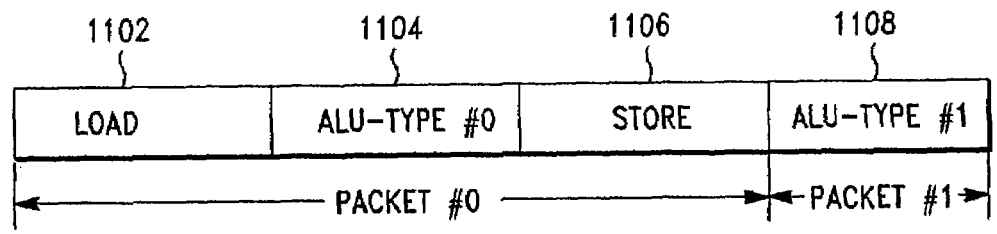
FIG. 11 is a block diagram of a nano-instruction bucket of the present invention.

As mentioned above, CISC instructions are decoded by the IDU into nano-instructions, which are processed by the RISC processor core, referred to as the IEU. Nano-instructions are passed from the IDU to the IEU in groups of four, called "buckets". A single bucket is shown FIG. 11. Each bucket consists of two packets, plus general information pertaining to the entire bucket. Packet #0 always contains three nano-instructions which are executed in-order: a LOAD instruction 1102, an ALU-type instruction 1104, and a STORE instruction 1106. Packet #1 consists of a single ALU-type instruction 1108.

The IEU can accept buckets from the IDU at a peak rate of one per cycle. The IDU processes basic instructions at a peak rate of two per cycle. Since most basic instructions are translated into a single packet, two basic instructions can usually be placed in one bucket and passed to the IEU together. The primary restriction on this rate is that the basic instructions must match the requirements of a bucket:

only one of the two basic instructions can reference a memory operand (there is only one load/store operation per bucket), and both instructions must consist of a single ALU-type operation (as opposed to one instruction requiring two ALU-type operations).

If one or both of these restrictions is violated, the bucket is sent to the IEU with nano-instructions corresponding to only one of the basic instructions, and the remaining instruction is sent in a later bucket. These requirements closely mirror the capabilities of the IEU, i.e., an IEU having two ALUs and one Load/Store unit, so in reality they do not present a limitation on performance. An example of this type of IEU is disclosed in commonly owned, co-pending applications titled, "High-Performance, Superscalar-Based Computer System with Out-of-Order Instruction Execution," application Ser. No. 07/817,810, filed Jan. 8, 1992, now U.S. Pat. No. 5,539,911, which is a continuation of application Ser. No. 07/727,006, filed Jul. 8, 1991, now abandoned, and "High Performance, Superscalar-Based Computer System with Out-of-Order Instruction Execution and Concurrent Results Distribution," application Ser. No. 08/397,016 filed Mar. 1, 1995, now U.S. Pat. No. 5,560,032, which is a file wrapper continuation of application Ser. No. 07/817,809, filed Jan. 8, 1992, now abandoned, which is a continuation of application Ser. No. 07/727,058 filed Jul. 8, 1991, now abandoned, the disclosures of which are incorporated herein by reference.

3.4 Special Instructions

There are many functions that must be performed by microcode routines which are difficult or inefficient to perform using general-purpose instructions. Furthermore, due to the expanded architecture of the present RISC processor compared to conventional CISC processors, certain functions are useful, whereas such functions would be meaningless for an CISC processor, and thus cannot be performed using any combination of CISC instructions. Together, these situations led to the creation of "special instructions".

An example of the first category of special instructions is the extract_desc_base instruction. This instruction extracts various bit-fields from two of the microcode general-purpose registers, concatenates them together and places the result in a third general register for use by microcode. To perform the same operation without the benefit of this instruction, microcode would have to perform several masking and shift operations, plus require the use of additional registers to hold temporary values. The special instruction allows the same functionality to be performed by one instruction during a single cycle, and without the use of any scratch registers.

Two examples of the second category of special instructions were already presented: the two return instructions, aret and eret, used to end microcode routines. These instructions are only meaningful in the microcode environment, and thus have no equivalent instructions or instruction sequences in the CISC architecture. In this case, special instructions were required for correct functionality, not just for performance reasons.

Since the special instructions are only available to microcode routines, and emulated instructions can only be encountered in the target CISC instruction stream, the opcodes of emulated instructions are re-used in microcode mode for the special instructions. Thus, when one of these opcodes is encountered in the target CISC instruction stream, it merely indicates that the microcode emulation routine for that instruction should be executed. When the same opcode is encountered in the microcode instruction stream, however, it has a completely different function as one of the special instructions. To support this opcode re-use, the IDU keeps track of the current processor state and decodes the instructions appropriately. This re-use of the opcodes is transparent to the IEU.

The IDU decodes each CISC instruction (of the i486™ instruction set, for example) and translates each instruction into several RISC processor nano-instructions. As described above, each CISC instruction is translated into 0 to 4 nano-instruction(s), depending on its complexity and functionality. The IDU decodes and translates two CISC instructions per cycle at best case. The basic functions of the IDU can be summarized as follows, it functions to:

Decode one CISC instruction per half cycle;
Decode the 1st CISC instruction in a first phase;
Hold as valid the decoded results of the 1st CISC instruction through the second phase;
Decode the 2nd CISC instruction in the second phase;
Combine the outputs of two instructions, if possible in the third phase; and
Output one bucket comprising four nano-instructions per cycle.

3.5 Instruction Decode Unit Block Diagrams

Figure 12:
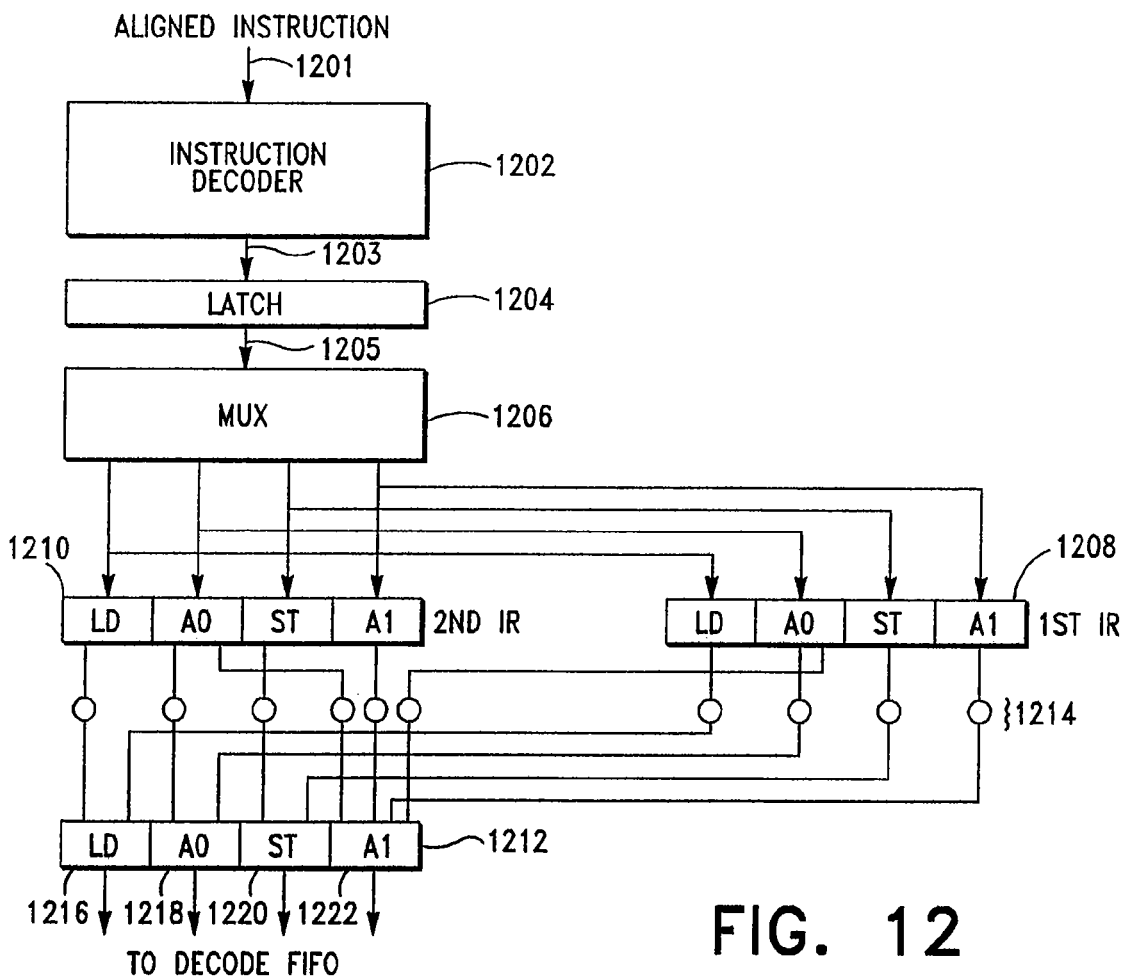
FIG. 12 is a representative block diagram of the instruction decode unit (IDU) of the present invention.

A block diagram of the IDU is shown in FIG. 12. Aligned instructions from the IAU arrive at the IDU on a bus 1201 which is 32 bits wide ([31:0] or 4 bytes). The aligned instructions are received by an Instruction Decoder 1202. The IDU 1202 only looks at the first four bytes of an aligned instruction in order to perform the CISC to RISC transformation.

The Instruction Decoder 1202 operates in one clock phase (a half cycle). The aligned instruction goes through the decoder and the decoded information that exits is MUXed and fed into a half cycle delay latch 1204 via a bus 1203. The decoded information therefore experiences the equivalent to a one phase pipeline delay.

After the half cycle delay, the decoded information is sent via a bus 1205 to a MUX 1206 to determine the actual register codes used. At this stage of decoding, the decoded information is arranged in the nano-instruction format. The nano-instruction is then latched. Two complete nano-instruction buckets are latched per cycle. The latching of two nano-instruction buckets is shown diagrammatically by 1st IR and 2nd IR buckets 1208 and 1210, respectively.

The IDU attempts to assemble buckets 1208 and 1210 into a single bucket 1212. This assembly is performed by a set of control gates 1214. The IDU first looks at the TYPE of each nano-instruction, and determines if the TYPEs are such that they can be combined. Note that either LoaD (LD) operation of the two latched instructions can be placed in a LD location 1216 of the single bucket 1212; either STore (ST) operation of the latched instructions can be placed in a ST location 1218 of the single bucket; either A0 operation can be placed in an A0 location 1220; and any A0 or A1 operation can be placed in an A1 location 1222.

The IDU treats the instructions as a whole. If the IDU cannot pack the two instructions into one bucket, it will leave one complete instruction behind. For example, if the 1st IR latch has only an A0 operation, and the 2nd IR latch includes all four operations, the IFU will not take the A1 from the 2nd IR latch and merge it with the A0 operation. The A0 operation will be sent by itself and the 2nd IR latch's set of operations will be transferred to the 1st IR latch and sent on the next phase, during which time the 2nd IR latch is reloaded. In other words, the operations stored in the 1st IR latch will always be sent, and the operations stored in the 2nd IR latch will be combined with the 1st IR latch operations if possible. The previous pipeline stages of the IDU and IAU must wait in the event that the 1st and 2nd IRs cannot be combined. The following situations permit the IDU to combine the 1st and 2nd IR latch operations:

both only use A0, or
one only uses A0 and the other uses only A0, LD and ST.

Combination logic can readily be designed by those skilled in the art to generate the necessary control signals for the control gates to merge the content of the 1st and 2nd IR latches, based on the functionality discussed above and basic logic design practice.

Emulation mode is entered when the IDU identifies an instruction belonging to the subset of instructions requiring emulation. An EMULation MODE control signal (EMUL_MODE) is sent to the decoders of the IDU once emulation mode is entered. Direct decoding of the CISC instruction stops, and the microcode routine corresponding to the identified instruction is sent to the IDU for decoding. The IDU decoders return to basic mode for decoding further CISC instructions when the microcode routine is finished emulation of the subset instruction. Fundamentally, basic CISC instructions and microcode instructions are handled in the same way by the IDU. Only the interpretation of the opcode changes.

Karnaugh maps of the default (basic) mode for both 1 and 2 byte opcode instructions are shown at FIGS. 13A-13E. The numbers along the left hand side and the top of the Karnaugh maps represent the opcode bits. For example, a one-byte opcode coded as hex 0F corresponds to the first row and 11th column, which is the "2 byte escape" instruction.

The instruction boxes that are shaded gray in the Karnaugh map of FIGS. 13A-E represent basic instructions and the white boxes are those instructions which must be emulated.

Figure 14:
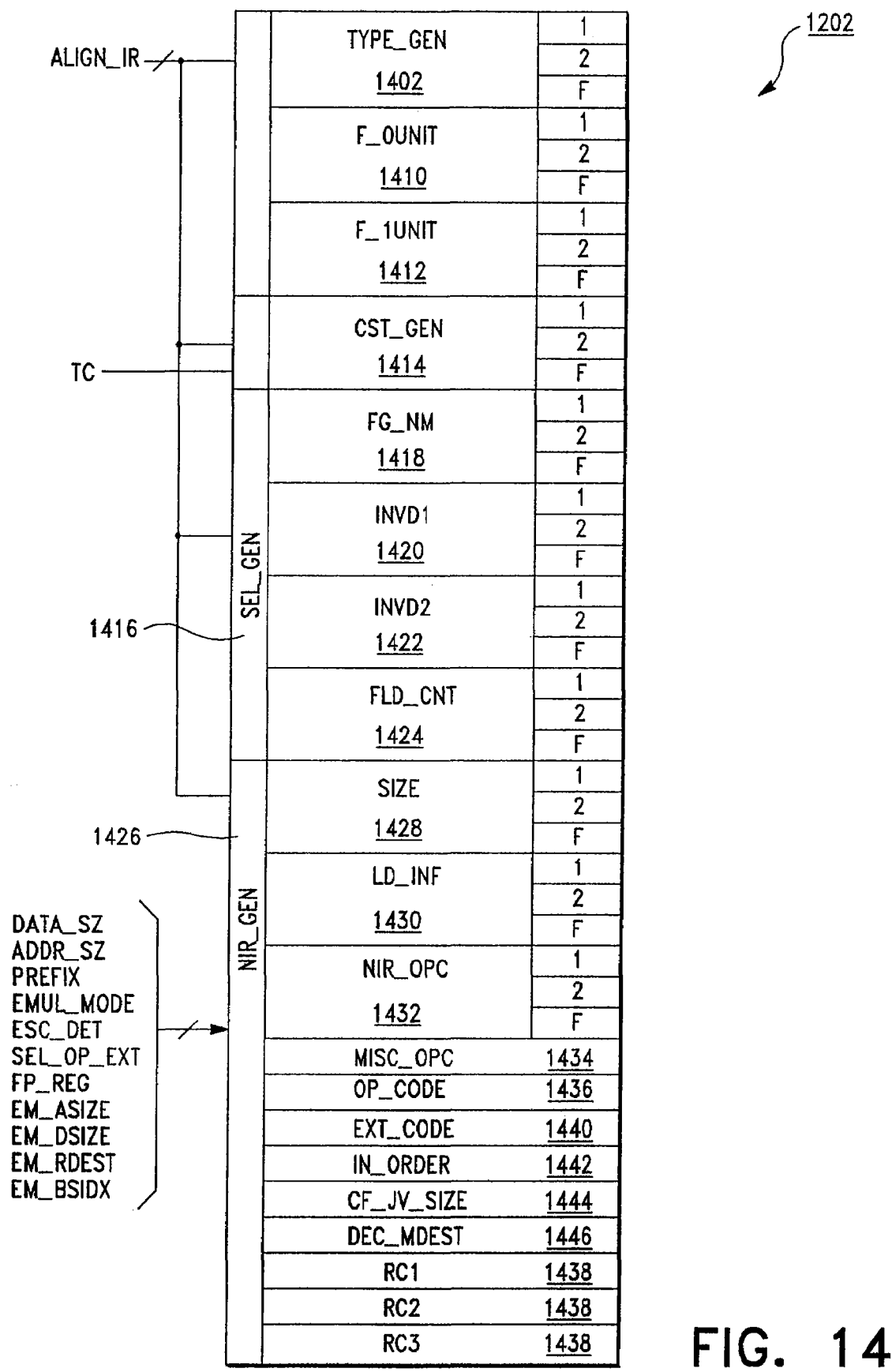
FIG. 14 shows an example block diagram of the Instruction Decoder section of the IDDD of the present invention.

A block diagram of the IDU's Instruction Decoder 1202 is shown in FIG. 14. The Instruction Decoder 1202 includes a plurality of decoders that are used to decode the CISC instructions and microcode routines.

A TYPE GENerator (TYPE_GEN) decoder 1402 receives the first full aligned instructions on the ALIGN_IR bus, and decodes instructions one at a time to identify the TYPE field of the instruction.

The identified TYPE field corresponds to the nano-instruction operations discussed above in connection with the IDU. The TYPE is signified by a 4 bit field representing each operation in a bucket (Load, ALU0, Store and ALU1). The TYPE_GEN decoder 1402 specifies which of those four operations are needed to execute the instruction. Depending on the instruction received, any number from 1-4 of the operations may be required to satisfy the CISC instruction.

For example, an add operation, which sums the contents in one register with the contents in another register, requires only one ALU nano-instruction operation. Alternatively, an instruction which requires the addition of the contents of a register with a memory location would require a Load, an ALU operation and then a Store operation, thus totaling three nano-instruction operations. (The data must be read from memory, added to the register, and then stored back in memory). More complicated CISC instructions may require all four nano-instructions.

The TYPE_GEN decoder 1402 comprises three TYPE decoders. A first decoder TYPE1 assumes that the instruction has a one-byte opcode followed by the ModR/M byte, and computes the TYPE based on that assumption. A second decoder TYPE2 assumes that the instruction has a two-byte opcode. The first byte being the ESCAPE byte, followed by the second byte which is the opcode and the third byte which is the ModR/M byte. A third decoder TYPEF assumes that the instruction is a floating point instruction, and decodes the instruction based on that assumption.

The TYPE_GEN decoder has three 4 bit wide TYPE instruction output buses (TYPE1, TYPE2, and TYPEF). Each bit corresponds to one of the 4 nano-instruction operations in a bucket. The specific TYPE field specifies which nano-instruction operations are necessary to carry out the CISC instruction. For example, if all 4 bits are logic HIGH, the CISC instruction requires a Load, a Store and two ALU operations.

The remaining decoders in FIG. 14 that include sections labeled 1, 2 and F decode assuming a 1 byte opcode, a 2 byte opcode and a floating point instruction, respectively. The invalid results are merely not selected. A multiplexer selects the output of the correct decoder.

The two ALU operations (ALU0 and ALU1) each have an opcode field which is 11 bits long. The 11 bits comprise the 8 bits of the opcode and three opcode extension bits from the adjacent ModR/M byte. For most CISC instructions processed by the IDU, the opcode bits are directly copied to the nano-instruction operations. Some CISC instructions, however, may require opcode substitution; here the IDU unit does not merely filter the CISC opcode to the instruction execution unit (IEU). This will become evident to those skilled in the art, because the type and number of functional units in the IEU will dictate whether or not opcode replacement is required within the IDU for specific CISC instructions.

In order for the IEU to process ALU operations, it must receive information concerning which functional unit is needed to process the specified ALU operation. The IDU therefore includes a Functional zero UNIT (F_0UNIT) decoder 1410, which comprises decoders F_0UNIT1, F_0UNIT2 and F_0UNITF. The outputs of the decoders are multi-byte fields that indicate which functional unit is necessary for processing the A0 ALU operation. The functional unit decoding for the A1 ALU operation is identical, but is handled by a separate decoder F_1UNIT 1412.

Many CISC instructions carry out operations using registers that are implied by the opcode. For example, many instructions imply that the AX register is to be used as an accumulator. A ConSTant GENerator (CST_GEN) decoder 1414 is therefore included to generate register indices based on the opcode of the CISC instruction. The CST_GEN decoder specifies which register(s) are implied based on the specific opcode. Multiplexing for generating the correct source and destination register indices for the nano-instructions will be discussed below in conjunction with FIG. 15.

An additional two bit control signal, TempCount (TC), is input to the CST_GEN decoder. The TC control signal is a two bit counter representing 4 temporary registers which may be cycled through for use as dummy registers by the IEU. The temporary (or dummy) registers represent another value of register that can be passed on by the CST_GEN decoder, in addition to the implied registers. The constant generator decoder passes on 4 constant fields because there are 2 ALU operations having 2 registers per operation. Each constant register bus is 20 bits wide, with each constant being a total of 5 bits, thereby permitting selection of one of the 32 registers in the IEU.

A SELect GENerator (SEL_GEN) decoder, shown generally at block 1416, will now be discussed. The SEL_GEN decoder includes a FlaG Need Modify (FG_NM) decoder 1418. The FG_NM decoder decodes for a one-byte opcode, a 2 byte opcode and a floating point instruction. In the i486™ instruction set, for example, there are a total of 6 flags. These flags have to be valid before execution of some instructions begin, while the flags may be modified by some instructions. The FG_NM decoder outputs two signals per flag, one bit indicates whether the flag is needed for execution of this instruction and the other indicates whether or not this instruction actually modifies the flag.

Register INValiDation information concerning the ALU0 and ALU1 operations are decoded by an INVD1 and an INVD2 decoder, shown at 1420 and 1422 respectively. The INVD1 and INVD2 decoders are also part of the SEL_GEN decoder 1416. INVD1 and INVD2 generate control signals for the IEU. These signals indicate whether the ALU registers should be used or not. Three possible register indices can be specified by each ALU operation. One can be used as a source and/or destination register, and the remaining two are limited to specifying source registers. A 4 bit field is uses to specify which register(s) are required by the operation.

The SEL_GEN decoder 1416 further includes a FLD_CNT decoder 1424 that indicates which of the register fields is required for the CISC instruction. The FLD_CNT decoder specifies which of the 2 fields is the source register and which is the destination register.

A Nano-InstRuction GENerator (NIR_GEN) decoder is shown generally as block 1426. The data size (DATA_SZ) and address size (ADDR_SZ) input control signals correspond to the default that the system is operating in. In order to decode the final address and operand size, the default mode must be known and the presence of any prefixes (discussed above in conjunction with the IAU) must be known. The EMUL_MODE control signal is also input to the NIR_GEN decoder, but it is also used by the other decoders.

The ESCape DETect (ESC_DET) input control signal is fed to the NIR_GEN decoder to indicate whether the instruction has a 2 byte opcode. In addition, a SELect OPcode EXTension (SEL_OP_EXT) input control signal is used to generate loading of the mailbox registers when an emulation instruction is detected.

A Floating Point REGister (FP_REG) input control signal passes the translated floating point register index to the IDU. The floating point format of the i486™, for example, has eight registers for floating point numbers, but the registers are accessed like a stack. Accessing these registers is accomplished by using a stack accessing scheme: registers being the top of the stack, register1 being the next top register, etc. This register stack is emulated by using eight linear registers with fixed indices. When the input instruction specifies registers, a translation block (not shown), translates the stack relative register index into the register index for the linear registers in a known manner. This permits the IDU to keep track of which register is on the top of the stack.

When the system branches to emulation mode, the IDU saves information about the instruction being emulated. The IDU saves the Data SIZE (EM_DSIZE) and Address SIZE (EM_ASIZE) of the instruction, as well as the Register index of the DESTination (EM_RDEST), the source (EM_RDEST2) and the Base InDeX information (EM_BSIDX). This saved information is used by the microcode routine to properly emulate the instruction. Take for example the emulation of an add instruction. The microcode routine may check EM_ASIZE to determine the address size of the add instruction so that it knows what address size to emulate.

The NIR_GEN decoder 1426 includes a SIZE decoder 1428. The fields generated by the SIZE decoder (i.e., SIZE1, SIZE2 and SIZEF) indicate the address size, operand size and immediate data size of the instruction. An address size of 16 or 32 bits, an operand size of 8, 16 or 32 bits and an immediate data field size of 8, 16 or 32 bits are extracted for each instruction.

Another NIR_GEN decoder is called a LoaD INFormation (LD_INF) decoder 1430. The LD_INF decoder decodes information corresponding to the Load and Store operations. The Load information is used for effective address calculations. The Load information fields (LD_INF1, LD_INF2 and LD_INFF) can be used to specify which addressing mode is being used by the CISC instruction, since CISC instruction sets usually support many different addressing modes.

The i486™ basic addressing mode includes a segment field and an offset which are added together to determine the address. An index register can be specified, as well as a scale for the index register (e.g., if the index registers are elements in an array), the elements can be specified as 1, 2, 4 or 8-bytes in length, thus the index register can be scaled by 1, 2, 4 or 8 before it is added to determine the address. The base and index are also specified by the LD_INF fields.

A Nano-InstRuction OPCode (NIR_OPC) decoder 1432 transfers opcode for the A1 operation (packet1). The decoded fields (NIR_OPC1, NIR_OPC2 and NIR_OPCF) comprise the first instruction byte (8 bits), plus three extension bits from the second byte.

A MiScellaneous OPCode (MISC_OPC) decoder 1434 indicates whether the instruction is a floating point instruction and whether a load instruction is actually present. The field generated by the MISC_OPC decoder will indicate whether conversion of the floating data is necessary. Multiplexing is not necessary for this decoder, because this information is easily extracted, regardless of the format of the instruction.

The opcode for the A0 operation of packet0 is specified by an OP_CODE decoder 1436. The A0 opcode is usually copied directly from the i486™ input opcode, but for some instructions the opcode is replaced by an alternate opcode. (As noted above, the functionality of the signals generated by the NIR_GEN decoder are specific to the CISC instruction set being decoded, and thus should become evident to those skilled in the art upon review of the CISC instruction set and the nano-instruction format of the present invention.)

An EXT_CODE decoder 1440 extracts the 3 bit opcode extension from the ModR/M byte.

A IN_ORDER decoder 1442 decodes the instruction to determine whether the instruction must be executed "in order". This instructs the IEU not to do anything with this instruction until all the previous instructions have been executed. Once the execution of the instruction is completed, execution of subsequent instructions is started.

A Control Flow Jump Size decoder 1444 indicates the displacement size for jumps that specify an address. This field, labeled CF_JV_SIZE, specifies the size of the address for the jump. This is specific to the type of addressing scheme employed by the CISC instruction set.

A 1 bit decoder labeled DEC_MDEST 1446 indicates whether or not the destination of the instruction is a memory address.

Finally, the Instruction Decoder includes three Register Code decoders 1438 to select the register codes (indices). The i486™ instruction format encodes the index of the register fields in various places within the instruction. The indices of these fields are extracted by the RC decoder. The ModR/M byte also has two register indices, which are used as the destination/source as specified by the opcode itself. The Register Code decoder 1438 generates three RC fields RC1, RC2 and RC3. RC1 and RC2 are extracted from the ModR/M byte as follows, if the processor is not in emulation mode, and that instruction is not a floating point instruction: RC1=bits [2:0] of the ModR/M byte; RC2=bits [5:3] of the ModR/M byte; and RC3=bits [2:0] of the opcode. For floating point instructions in basic (not emulation) mode, RC1, RC2 and RC3 are assigned as follows:

RC1: ST(0)=Top of stack;
RC2: ST(1)=Second item on stack=next to the top of the stack; and
RC3: ST(i)=The $i^{th}$ item from the stack, where i is specified in the opcode.

In emulation mode, RC1, RC2 and RC3 are assigned as follows:

RC1: bits [4:0] of byte 3;
RC2: bits [1:0] of byte 2 and bits [7:5] of byte 3; and
RC3: bits [6:1] of byte 2.

Figure 15:
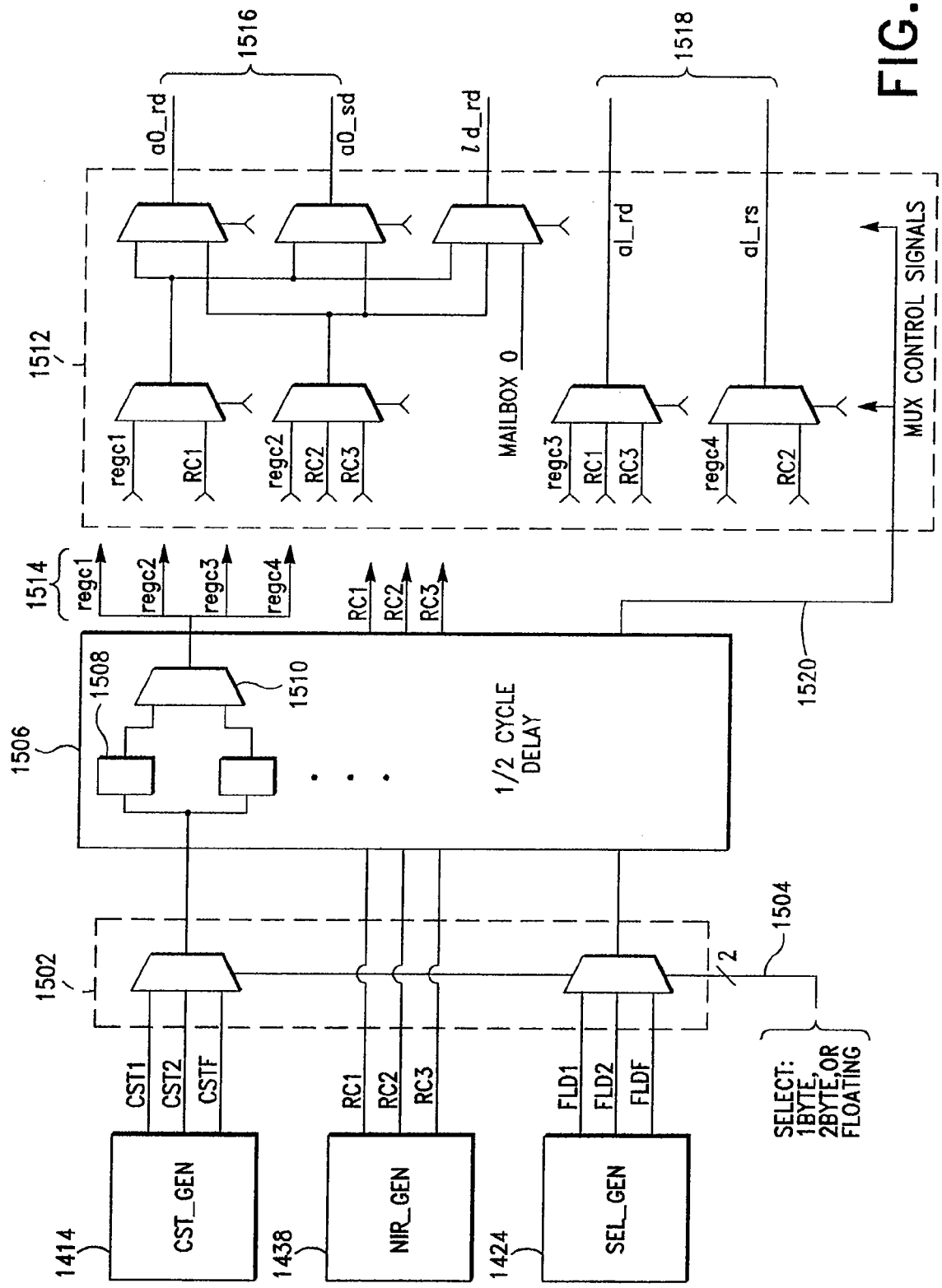
FIG. 15 depicts a representative block and logic diagram of a set of decoders of the Instruction Decoder shown in FIG. 14.

FIG. 15 shows a representative block and logic gate diagram for the CST_GEN, NIR_GEN and SEL_GEN decoders (1414, 1438 and 1424 respectively). It should be understood that this FIG. 15 is an example of how the 1 byte opcode, 2 byte opcode and floating point decoded results are selected, delayed, and combined to generate source and destination register indices for nano-instruction operations A0 and A1, and the destination register index for the Load instruction. The methodology of the selection, delay and multiplexing applies to all of the signals generated by the INSTRUCTION DECODER 1202, with the exception of those signals which do not generate separate 1 byte opcode, 2 byte opcode and floating point results. Furthermore, the results generated by this example are application specific, in other words, they apply to decoding of i486™ instructions into the nano-instruction format of the present invention. The principles discussed throughout these examples, however, are generally applicable to any CISC to RISC instruction alignment and decoding.

As discussed above, the CST_GEN decoder 1414 generates three outputs, CST1, CST2 and CSTF, each of which comprise four constant 5 bit register fields (20 bits total). The SEL_GEN generates register field control signals (FLD1, FLD2, and FLD3 for the selection of the multiplexers in a further section MUX 1512. The selection of the CST1, CST2 or CSTF results and the FLD1, FLD2, and FLDF results is shown generally at the multiplexer block 1502. A 3 bit MUX select line 1504 is used to select the results depending on whether the instruction has a 1 byte opcode, 2 byte opcode, or is a floating point instruction.

A ½ cycle pipeline delay latch 1504 is used to delay the results selected by the multiplexer 1502, and the three register control fields RC1, RC2, and RC3. Each input to the ½ pipeline delay 1504 is sent to a pair of oppositely clocked latches 1508. The contents of the latches are selected by a multiplexers 1510. This arrangement is similar to the cycle delay 316 discussed above in connection to the IAU.

A further multiplexing stage is shown in block 1512. The constant register fields selected by the multiplexer 1502 are input to the multiplexer 1512 as four separate fields labeled regc1 through regc4, respectively, as shown generally at 1514. Also shown as inputs to the block 1512 are the EXTRACT REGISTER fields RC1, RC2, and RC3 from the opcode and ModR/M bytes. The regc fields and RC fields are combined by logic in the block 1512 under control of an FLD control signal 1520 to generate the source and destination register indexes a0_rd and a0_rs for operation A0, which are shown generally at 1516, as well as the source and destination register indexes a1_rd and a1_rs for operation A1, which are shown generally at 1518. An index ld_rd, which is the destination register index for the Load instruction, is also selected in the block 1512.

4.0 Decoded Instruction FIFO

A block diagram of a Decode FIFO (DFIFO) in conjunction with the present invention is shown in FIG. 16A. The DFIFO holds four complete buckets, each of which contains four nano-instructions, two immediate data fields, and one displacement field. Each bucket corresponds to one level of pipeline register in the DFIFO. These buckets are generated in the IDU and pushed to the DFIFO during each cycle that the IEU requests a new bucket. The nano-instructions in a bucket are divided into two groups, called packet0 and packet1. Packet0 can consist of a Load, ALU, and/or Store operation, which corresponds to one, two, or three nano-instruction. Packet1 can only be an ALU operation, corresponding to one nano-instruction. As a result of this division, a bucket can only contain two ALU operations, and only one of them can reference memory. If subsequent instructions both require memory operands, they must be placed in separate buckets.

As can be seen from FIG. 16B, there is only a fair amount of general information associated with each packet and with the bucket as a whole. This information is stored in a general information FIFO. By default, the four nano-instructions in a bucket are executed in order, from NIR0 to NIR3. One of the bucket general information bits can be set to indicate that NIR3 should be executed before NIR0-NIR2. This feature makes it much easier to combine subsequent instructions into a single bucket, because their order no longer affects their ability to fit the bucket requirements.

FIG. 16C shows an immediate data and displacement FIFO for buckets0-4. IMM0 represents the immediate data corresponding to packet0, and IMM1 represents the immediate data corresponding to packet1. DISP represents the displacement corresponding to packet0. Packet1 does not use DISP information because the DISP fields are only used as a part of address calculation.

A specific example of the three types of nano-instruction described above is shown in FIG. 17. The field descriptions and definitions are also described in Appendix A, pages 1-10. These tables provide detailed information about the contents of each bucket.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

APPENDIX A

| SIGNAL NAME | NAME | BIT | DEFINITION |
|---|---|---|---|
| | | | TYPE FIELD (NOP BITS) |
| ID_TYPE0*<3> | A1_NOP | 1 | No operation with the A1 instruction.<br>1: Ignore the A1 instruction.<br>0: Execute the A1 instruction |
| ID_TYPE0*<2> | ST_NOP | 1 | No operation with the STORE instruction.<br>1: Ignore the STORE instruction.<br>0: Execute the STORE instruction |
| ID_TYPE0*<1> | A0_NOP | 1 | No operation with the A0 instruction.<br>1: Ignore the A0 instruction.<br>0: Execute the A0 instruction |
| ID_TYPE0*<0> | LD_NOP | 1 | No operation with the LOAD instruction.<br>1: Ignore the LOAD instruction.<br>0: Execute the LOAD instruction<br>BUCKET General Information |
| ID_BKT<6> | SEL_FST | 1 | Immediate data correspondence indicator<br>1: Immediate0 corresponds to packet0<br>0: Immediate0 corresponds to packet1 |
| ID_BKT<5> | EX_ORDER | 1 | Determine the execution order of the packets in this bucket.<br>1: Packet1(NIR3) first.<br>0: Packet0(NIR0-2) first. |
| ID_BKT<4> | MIX | 1 | Mix field.<br>1: Execute Packet0 and Packet1 simultaniously.<br>0: Execute in order determined by EX_ORDER bit. |
| ID_BKT<3> | U_CODE | 1 | Indicate the Emulation mode.<br>1: Emulation mode.<br>0: Normal mode. |
| ID_BKT<2> | W_CODE | 1 | Indicate the number of 486-IRs in a bucket.<br>1: Two 486-IRs in a bucket.<br>0: One 486-IRs in a bucket. |
| ID_BKT<1> | LOCK | 1 | The LOCK prefix is present before the Instruction.<br>1: LOCK prefix is present.<br>0: LOCK prefix is not present. |
| ID_BKT<0> | UNLOCK | 1 | The UNLOCK prefix is present before the Instruction.<br>1: UNLOCK prefix is present.<br>0: UNLOCK prefix is not present.<br>PACKET1 General Information |
| ID_PKT1<12> | P1_ASIZE | 1 | Indicate the address size of address caliculation and stack operation<br>1: 32-bit address mode<br>0: 16-bit address mode. |

APPENDIX A-continued

| SIGNAL NAME | NAME | BIT | DEFINITION |
|---|---|---|---|
| ID_PKT1<11:9> | P1_OSIZE | 3 | Indicate the operand size of execution.<br>　　If FPP = 0 (Integer type)　　If FPP = 1 (Floating point type)<br>　　0 0 0　8-bit　　　　　　　　0 0 0　—<br>　　0 0 1　—　　　　　　　　　0 0 1　—<br>　　0 1 0　16-bit　　　　　　　 0 1 0　16-bit<br>　　0 1 1　32-bit　　　　　　　 0 1 1　32-bit<br>　　1 0 0　64-bit　　　　　　　 1 0 0　64-bit<br>　　1 0 1　—　　　　　　　　　1 0 1　80-bit<br>　　1 1 0　216-bit results　　　　1 1 0　—<br>　　1 1 1　232-bit results　　　　1 1 1　— |
| ID_PKT1<8:5> | P1_DPC | 4 | Delta PC, added to execution PC after packet1 is executed.<br>0-15 Length of 486 Instruction in packet1. |
| ID_PKT1<4:3> | P1_ISIZE | 2 | Size of the immediate data corresponding to packet1.<br>　　0 0　　　　　　　　　8-bit<br>　　0 1　　　　　　　　　na<br>　　1 0　　　　　　　　　16-bit<br>　　1 1　　　　　　　　　32-bit |
| ID_PKT1<2> | P1_FPP | 1 | Floating point instruction indicater<br>1: Floating point instruction<br>0: Integer instruction |
| ID_PKT1<1> | P1_ESC | 1 | Second byte escape instruction indicator<br>1: Second byte instruction (first byte is 0Fh)<br>0: First byte instruction |
| ID_PKT1<0> | P1_INORDER | 1 | Inorder bit. Indicates out-of-order issue must be disabled.<br>1: Do not execute until all previous instructions are finished.<br>0: Execute when resources are available.<br>PACKET0 General Information |
| ID_PKT0<12> | P0_ASIZE | 1 | Indicate the address size of address caliculation and stack operation<br>1: 32-bit address mode<br>0: 16-bit address mode |
| ID_PKT0<11:9> | P0_OSIZE | 3 | Indicate the operand sire of execution.<br>　　If FPP = 0 (Integer type)　　If FPP = 1 (Floating point type)<br>　　0 0 0　8-bit　　　　　　　　0 0 0　—<br>　　0 0 1　—　　　　　　　　　0 0 1　—<br>　　0 1 0　16-bit　　　　　　　 0 1 0　16-bit<br>　　0 1 1　32-bit　　　　　　　 0 1 1　32-bit<br>　　1 0 0　64-bit　　　　　　　 1 0 0　64-bit<br>　　1 0 1　—　　　　　　　　　1 0 1　80-bit<br>　　1 1 0　216-bit results　　　　1 1 0　—<br>　　1 1 1　232-bit results　　　　1 1 1　— |
| ID_PKT0<8:5> | P0_DPC | 4 | Delta PC, added to execution PC after packet0 is executed.<br>0-15 Length of 486 instruction in packet0. |
| ID_PKT0<4:3> | P0_ISIZE | 2 | Indicate the Immediate data size of execution.<br>　　0 0　　　　　　　　　8-bit<br>　　0 1　　　　　　　　　na<br>　　1 0　　　　　　　　　16-bit<br>　　1 1　　　　　　　　　32-bit |
| ID_PKT0<2> | P0_FPP | 1 | Floating point instruction indicater<br>1: Floating point instruction<br>0: Integer instruction |
| ID_PKT0<1> | P0_ESC | 1 | Second byte escape instruction indicator<br>1: Second byte instruction (first byte is 0Fh)<br>0: First byte instruction |
| ID_PKT0<0> | P0_INORDER | 1 | Inorder bit. Indicates out-of-order issue must be disabled.<br>1: Do not execute until all previous instructions are finished.<br>0: Execute when resources are available.<br>NIR3 (A1) |
| ID_NIR3<44:34> | A1_OP | 11 | Operation code of the A1 instruction.<br>　　Integer type　　　　　IR7-0, MOD5-3<br>　　Floating point　　　　MOD7-6, MOD2-0, IR2-0, MOD5-3<br>　　Special type IR　　　 Code will be generated by IDU<br>　　　　　　　　　　　　3 lsb's used to select bank for special moves |
| ID_NIR3<33:30> | A1_FU | 4 | Function Unit Code.<br>　　0 0 0 0　　　　　　　No Function Unit required.<br>　　0 0 0 1　　　　　　　IMP<br>　　0 0 1 0　　　　　　　FMULT<br>　　0 0 1 1　　　　　　　ALU<br>　　0 1 0 0　　　　　　　SHIFT<br>　　0 1 0 1　　　　　　　SCAN<br>　　0 1 1 0　　　　　　　MOV<br>　　0 1 1 1　　　　　　　FALU<br>　　1 0 0 0　　　　　　　undefined |

APPENDIX A-continued

| SIGNAL NAME | NAME | BIT | DEFINITION | |
|---|---|---|---|---|
| ID_NIR3<29:18> | A1_FGNM | 12 | Flag need/modify field. | |
| | | | BIT 11 | Need OF |
| | | | BIT 10 | Modify OF |
| | | | BIT 9 | Need SF |
| | | | BIT 8 | Modify SF |
| | | | BIT 7 | Need ZF |
| | | | BIT 6 | Modify ZF |
| | | | BIT 5 | Need AF |
| | | | BIT 4 | Modify AF |
| | | | BIT 3 | Need PF |
| | | | BIT 2 | Modify PF |
| | | | BIT 1 | Need CF |
| | | | BIT 0 | Modify CF |
| ID_NIR3<17> | A1_RINV<3> | 1 | RS2 register field is invalid. | |
| | | | 1: RS2 register field is invalid. | |
| | | | 0: RS2 register field is valid. | |
| ID_NIR3<16> | A1_RINV<2> | 1 | RS/RD register field is invalid as a SOURCE register. | |
| | | | 1: RS/RD register field is invalid as a source. | |
| | | | 0: RS/RD register field is valid as a source. | |
| ID_NIR3<15> | A1_RINV<1> | 1 | RS/RD register field is invalid as a DESTINATION register. | |
| | | | 1: RS/RD register field is invalid. as a destination | |
| | | | 0: RS/RD register field is valid as a destination. | |
| ID_NIR3<14> | A1_RINV<0> | 1 | RS1 register field is invalid. | |
| | | | 1: RS1 register field is invalid. | |
| | | | 0: RS1 register field is valid. | |
| ID_NIR3<13> | A1_BI | 1 | Register bank indicator. | |
| | | | 1: Register bank applies to A1_RS | |
| | | | 0: Register bank applies to A1_RD | |
| ID_NIR3<12> | A1_FPBK | 1 | Floating point register bank indicator. | |
| | | | 1: Floating point instruction uses register bank #1. | |
| | | | 0: Floating point instruction uses register bank #0. | |
| ID_NIR3<11> | A1_RDHI | 1 | Destination byte location, valid only when OSIZE = 000b. | |
| | | | 1: Destination is high byte of A1_RD. | |
| | | | 0: Destination is low byte of A1_RD. | |
| ID_NIR3<10> | A1_RSHI | 1 | Source byte location, valid only when OSIZE = 000b. | |
| | | | 1: Source is high byte of A1_RS | |
| | | | 0: Source is low byte of A1_RS | |
| ID_NIR3<9:5> | A1_RD | 5 | Source/destination register no. in A1 instruction. (RS/RD) | |
| | | | If the register bank is 000b, then: | |
| | | | 0 0 0 0 0 | AL/eAX |
| | | | 0 0 0 0 1 | CL/eCX |
| | | | 0 0 0 1 0 | DL/eDX |
| | | | 0 0 0 1 1 | BL/eBX |
| | | | 0 0 1 0 0 | AH/eSP |
| | | | 0 0 1 0 1 | CH/eBP |
| | | | 0 0 1 1 0 | DH/eSI |
| | | | 0 0 1 1 1 | BH/eDI |
| ID_NIR3<4:0> | A1_RS | 5 | Source register no. in A1 instruction. (RS1) | |
| | | | If the register bank is 000b, then: | |
| | | | 0 0 0 0 0 | AL/eAX |
| | | | 0 0 0 0 1 | CL/eCX |
| | | | 0 0 0 1 0 | DL/eDX |
| | | | 0 0 0 1 1 | BL/eBX |
| | | | 0 0 1 0 0 | AH/eSP |
| | | | 0 0 1 0 1 | CH/eBP |
| | | | 0 0 1 1 0 | DH/eSI |
| | | | 0 0 1 1 1 | BH/eDI |
| | | | NIR1 (A0) | |
| ID_NIR1<44:34> | A0_OP | 11 | Operation code of the A0 instruction. | |
| | | | Integer type | IR7-0, MOD5-3 |
| | | | Floating point | MOD7-6, MOD2-0, IR2-0, MOD5-3 |
| | | | Special type IR | Code will be generated by IDU |
| | | | | 3 lsb's used to select bank for special moves |
| ID_NIR1<33:30> | A0_FU | 4 | Function Unit Code. | |
| | | | 0 0 0 0 | No Function Unit required. |
| | | | 0 0 0 1 | IMP |
| | | | 0 0 1 0 | FMULT |
| | | | 0 0 1 1 | ALU |
| | | | 0 1 0 0 | SHIFT |
| | | | 0 1 0 1 | SCAN |
| | | | 0 1 1 0 | MOV |
| | | | 0 1 1 1 | FALU |
| | | | 1 0 0 0 | undefined |
| ID_NIR1<29:18> | A0_FGNM | 12 | Flag need/modify field. | |
| | | | BIT 11 | Need OF |
| | | | BIT 10 | Modify OF |

APPENDIX A-continued

| SIGNAL NAME | NAME | BIT | DEFINITION | |
|---|---|---|---|---|
| | | | BIT 9 | Need SF |
| | | | BIT 8 | Modify SF |
| | | | BIT 7 | Need ZF |
| | | | BIT 6 | Modify ZF |
| | | | BIT 5 | Need AF |
| | | | BIT 4 | Modify AF |
| | | | BIT 3 | Need PF |
| | | | BIT 2 | Modify PF |
| | | | BIT 1 | Need CF |
| | | | BIT 0 | Modify CF |
| ID_NIR1<17> | A0_RINV<3> | 1 | RS2 register field is invalid. | |
| | | | 1: RS2 register field is invalid. | |
| | | | 0: RS2 register field is valid. | |
| ID_NIR1<16> | A0_RINV<2> | 1 | RS/RD register field is invalid as a SOURCE register. | |
| | | | 1: RS/RD register field is invalid as a source. | |
| | | | 0: RS/RD register field is valid as a source. | |
| ID_NIR1<15> | A0_RINV<1> | 1 | RS/RD register field is invalid as a DESTINATION register. | |
| | | | 1: RS/RD register field is invalid. as a destination | |
| | | | 0: RS/RD register field is valid as a destination. | |
| ID_NIR1<14> | A0_RINV<0> | 1 | RS1 register field is invalid. | |
| | | | 1: RS1 register field is invalid. | |
| | | | 0: RS1 register field is valid. | |
| ID_NIR1<13> | A0_BI | 1 | Register bank indicator. | |
| | | | 1: Register bank applies to A0_RS | |
| | | | 0: Register bank applies to A0_RD | |
| ED_NIR1<12> | A0_FPBK | 1 | Floating point register bank indicator. | |
| | | | 1: Floating point instruction uses register bank #1. | |
| | | | 0: Floating point instruction uses register bank #0. | |
| ID_NIR1<11> | A0_RDHI | 1 | Destination byte location, valid only when OSIZE = 000b. | |
| | | | 1: Destination is high byte of A0_RD. | |
| | | | 0: Destination is low byte of A0_RD. | |
| ID_NIR1<10> | A0_RSHI | 1 | Source byte location, valid only when OSIZE = 000b. | |
| | | | 1: Source is high byte of A0_RS | |
| | | | 0: Source is low byte of A0_RS | |
| ID_NIR1<9:5> | A0_RD | 5 | Source/destination register no. in A0 instruction. (RS/RD) | |
| | | | If the register bank is 000b, then: | |
| | | | 0 0 0 0 0 | AL/eAX |
| | | | 0 0 0 0 1 | CL/eCX |
| | | | 0 0 0 1 0 | DL/eDX |
| | | | 0 0 0 1 1 | BL/eBX |
| | | | 0 0 1 0 0 | AH/eSP |
| | | | 0 0 1 0 1 | CH/eBP |
| | | | 0 0 1 1 0 | DH/eSI |
| | | | 0 0 1 1 1 | BH/eDI |
| ID_NIR1<4:0> | A0_RS | 5 | Source register no. in A0 instruction. (RS1) | |
| | | | If the register bank is 000b, then: | |
| | | | 0 0 0 0 0 | AL/eAX |
| | | | 0 0 0 0 1 | CL/eCX |
| | | | 0 0 0 1 0 | DL/eDX |
| | | | 0 0 0 1 1 | BL/eBX |
| | | | 0 0 1 0 0 | AH/eSP |
| | | | 0 0 1 0 1 | CH/eBP |
| | | | 0 0 1 1 0 | DH/eSI |
| | | | 0 0 1 1 1 | BH/eDI |
| | | | NIR0 (LOAD) | |
| ID_NIR0<27:24> | LD_OP | 4 | Operation code of the LOAD instruction. | |
| | | | 0 0 0 0 | 486 operation |
| | | | 0 0 0 1 | VMOV - Load virtual |
| | | | 0 0 1 0 | LMOV - Load lenear |
| | | | 0 0 1 1 | PMOV - Load physical |
| | | | 0 1 0 0 | PDEMOV |
| | | | 0 1 0 1 | PTEMOV |
| | | | 0 1 1 0 | TLB PROVE |
| | | | 0 1 1 1 | LEA - Load effective address |
| | | | 1 0 0 0 | — |
| | | | 1 0 0 1 | DMOV - Descriptor. |
| | | | 1 0 1 0 | — |
| | | | 1 0 1 1 | — |
| | | | 1 1 0 0 | — |
| | | | 1 1 0 1 | — |
| | | | 1 1 1 0 | — |
| | | | 1 1 1 1 | — |
| ID_NIR0<23> | LD_FCNV | 1 | Convert real to extended real in floating point operation. | |
| | | | 1: Convert real to extended real. | |
| | | | 0: Don't need to convert.ss. | |

APPENDIX A-continued

| SIGNAL NAME | NAME | BIT | DEFINITION |
| --- | --- | --- | --- |
| ID_NIR0<22> | LD_MEM | 1 | Memory access.<br>1: Calculate the effective address with memory access.<br>0: Calculate the effective address without memory access. |
| ID_NIR0<21> | IDX_EN | 1 | Enable the Index register field<br>1: Calculate the effective address with the index register<br>0: Calculate the effective address without the index register. |
| ID_NIR0<20> | BASE_EN | 1 | Enable the base register field<br>1: Calculate the effective address with the base register<br>0: Calculate the effective address without the base register. |
| ID_NIR0<19:18> | DISP_EN | 2 | Enable the displacement data in the FIFO<br>0 0    No displacement<br>0 1    8-bit displacement<br>1 0    16-bit displacement<br>1 1    32-bit displacement |
| ID_NIR0<17:13> | LD_RD | 5 | Destination register number in LOAD instruction.<br>0 0 0 0 0    AL/eAX<br>0 0 0 0 1    CL/eCX<br>0 0 0 1 0    DL/eDX<br>0 0 0 1 1    BL/eBX<br>0 0 1 0 0    AH/eSP<br>0 0 1 0 1    CH/eBP<br>0 0 1 1 0    DH/eSI<br>0 0 1 1 1    BH/eDI |
| ID_NIR0<12:10> | LD_SEG | 3 | Indicates the segment register to use for address calculation<br>0 0 0    ES<br>0 0 1    CS<br>0 1 0    SS<br>0 1 1    DS<br>1 0 0    FS<br>1 0 1    GS<br>1 1 0    —<br>1 1 1    — |
| ID_NIR0<9:8> | LD_SCALE | 2 | Select the scale value<br>0 0    *1<br>0 1    *2<br>1 0    *4<br>1 1    *8 |
| ID_NIR0<7:3> | LD_BASE | 5 | Select the base register<br>0 0 0 0 0    eAX<br>0 0 0 0 1    eCX<br>0 0 0 1 0    eDX<br>0 0 0 1 1    eBX<br>0 0 1 0 0    eSP<br>0 0 1 0 1    eBP<br>0 0 1 1 0    eSI<br>0 0 1 1 1    eDI |
| ID_NIR0<2:0> | LD_IDX | 3 | Select the index register<br>0 0 0    eAX<br>0 0 1    eCX<br>0 1 0    eDX<br>0 1 1    eBX<br>1 0 0    —<br>1 0 1    eBP<br>1 1 0    eSI<br>1 1 1    eDI |

NOTE:
0* indicates the level of the DECODE FIFO.
It will be 0, 1, 2 and 3.
ID_TYPE0<3:0> for level 0
ID_TYPE1<3:0> for level 1
ID_TYPE2<3:0> for level 2
ID_TYPE3<3:0> for level 3

What is claimed is:

1. A microprocessor, comprising:
an instruction store configured to store variable-length complex instruction set computer (CISC) instructions;
an instruction alignment unit configured to provide an aligned CISC instruction, the instruction alignment unit comprising,
an extract shifter configured to output the CISC instruction as instruction bytes,
an align shifter configured to provide aligned instruction bytes,
an immediate data shifter configured to extract immediate data from the instruction bytes, and
a displacement shifter configured to extract displacement data from the instruction bytes;
an instruction decode unit configured to translate the aligned CISC instruction into one or more corresponding reduced instruction set computer (RISC) instructions; and an instruction execution unit configured to execute the one or more RISC instructions received from the instruction decode unit.

2. The microprocessor of claim 1, wherein the align shifter is further configured to separate prefixes from the instruction bytes.

3. The microprocessor of claim 1, wherein the extract shifter is configured to output the CISC instruction as N instruction bytes, wherein N is a positive integer, and
wherein the align shifter is configured to receive 2N instruction bytes and shift up to N instruction bytes per half cycle.

4. The microprocessor of claim 3, wherein N is equal to eight (8).

5. The microprocessor of claim 1, wherein the immediate data shifter and the displacement shifter are configured to receive the aligned instruction bytes.

6. The microprocessor of claim 5, wherein the instruction bytes received by the immediate data shifter and the displacement shifter are delayed by a half cycle to keep the instruction bytes from the extract shifter substantially synchronized with the aligned instruction bytes from the align shifter.

7. A method, comprising:
storing, in an instruction store, a plurality of variable-length complex instruction set computer (CISC) instructions;
aligning, using an instruction alignment unit, a CISC instruction from the instruction store unit to provide an aligned CISC instruction, wherein the aligning includes,
outputting, using an extract shifter, the CISC instruction as instruction bytes,
aligning, using an align shifter, the instruction bytes to provide aligned instruction bytes,
extracting, using an immediate data shifter, immediate data from the instruction bytes, and
extracting, using a displacement shifter, displacement data from the instruction bytes;
translating the aligned CISC instruction into one or more corresponding reduced instruction set computer (RISC) instructions; and
executing the one or more RISC instructions.

8. The method of claim 7, wherein the aligning the CISC instruction from the instruction store in the instruction alignment unit further comprises:
separating prefixes from the instruction bytes.

9. The method of claim 7,
wherein the outputting the CISC instruction as instruction bytes comprises outputting the CISC instruction as N instruction bytes, wherein N is a positive integer, and
wherein the aligning the instruction bytes to provide aligned instruction bytes comprises shifting up to N instructions bytes per half cycle.

10. The method of claim 9, wherein N is equal to eight (8).

11. The method of claim 9, further comprising:
transmitting the aligned instruction bytes to the immediate data shifter and the displacement shifter.

12. The method of claim 11, further comprising:
delaying the instruction bytes transmitted to the immediate data shifter and the displacement shifter by a half cycle to keep the instruction bytes from the extract shifter substantially synchronized with the aligned instruction bytes from the align shifter.

13. A computer system, comprising:
an external memory;
a microprocessor; and
a bus coupled between the external memory and the microprocessor;
wherein the microprocessor includes,
an instruction store configured to store variable-length complex instruction set computer (CISC) instructions;
an instruction alignment unit configured to provide an aligned CISC instruction, the instruction alignment unit comprising,
an extract shifter configured to output the CISC instruction as instruction bytes,
an align shifter configured to provide aligned instruction bytes,
an immediate data shifter configured to extract immediate data from the instruction bytes, and
a displacement shifter configured to extract displacement data from the instruction bytes;
an instruction decode unit configured to translate the aligned CISC instruction into one or more corresponding reduced instruction set computer (RISC) instructions; and
an instruction execution unit configured to execute the one or more RISC instructions received from the instruction decode unit.

14. The computer system of claim 13, wherein the align shifter is further configured to separate prefixes from the instruction bytes.

15. The computer system of claim 13,
wherein the extract shifter is configured to output the CISC instruction as N instruction bytes, wherein N is a positive integer, and
wherein the align shifter is configured to receive 2N instruction bytes and shift up to N instruction bytes per half cycle.

16. The computer system of claim 15, wherein N is equal to eight (8).

17. The computer system of claim 13, wherein the immediate data shifter and the displacement shifter are configured to receive the aligned instruction bytes.

18. The computer system of claim 17, wherein the instruction bytes received by the immediate data shifter and the displacement shifter are delayed by a half cycle to keep the instruction bytes from the extract shifter substantially synchronized with the aligned instruction bytes from the align shifter.

* * * * *